(12) United States Patent
Romig

(10) Patent No.: US 6,430,005 B1
(45) Date of Patent: *Aug. 6, 2002

(54) REMOVABLE CARTRIDGE DISK DRIVE WITH A RECEIVER FOR RECEIVING A CARTRIDGE HOUSING A HARD DISK

(75) Inventor: Alan D. Romig, Saginaw, MI (US)

(73) Assignee: Syquest Technology, Inc., Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/478,356

(22) Filed: Jun. 7, 1995

Related U.S. Application Data

(63) Continuation of application No. 08/334,609, filed on Nov. 4, 1994, now abandoned, which is a continuation of application No. 08/140,218, filed on Oct. 19, 1993, now abandoned, which is a continuation of application No. 07/850,683, filed on Mar. 10, 1992, now abandoned, which is a continuation-in-part of application No. 07/779,060, filed on Oct. 18, 1991, now Pat. No. 5,218,503.

(51) Int. Cl.[7] .............................. G11B 23/03; G11B 7/24
(52) U.S. Cl. ........................................ 360/133; 369/291
(58) Field of Search ................................ 360/97.01, 105, 360/902, 99.06, 99.08, 99.12, 133; 369/77.2, 291

(56) References Cited

U.S. PATENT DOCUMENTS

| | | | |
|---|---|---|---|
| 3,786,454 A | 1/1974 | Lissner et al. | 360/78.04 |
| 3,973,273 A | 8/1976 | Lissner et al. | 360/133 |
| 4,078,246 A | 3/1978 | Berthoux et al. | 360/133 |
| 4,503,474 A | 3/1985 | Nigam | 360/133 |
| 4,504,879 A | 3/1985 | Toldi et al. | 360/105 |

(List continued on next page.)

FOREIGN PATENT DOCUMENTS

| | | |
|---|---|---|
| EP | 0369651 A2 | 5/1990 |
| JP | 59157879 A | 2/1983 |
| JP | 58-50535 | 11/1983 |
| JP | 59-008173 | 1/1984 |
| JP | 62-24382 | 6/1987 |
| JP | 62208481 | 9/1987 |
| JP | 62-298980 | 12/1987 |
| JP | 63-47473 | 3/1988 |
| JP | 63-12480 | 4/1988 |
| JP | 64-19572 | 1/1989 |
| WO | WO 89/08312 | 9/1989 |

OTHER PUBLICATIONS

Declaration of Dr. Shrikant M. Desai (with exhibits), dated May 3, 1995.
"3.5–Inch Disk Drive Pack 331 and 425 MBytes" Klonick, John Jun. 28, 1990.*

*Primary Examiner*—David Davis
(74) *Attorney, Agent, or Firm*—Lyon & Lyon LLP

(57) ABSTRACT

A disk drive 100 capable of receiving a cartridge 20 having a disk 42 with a diameter of about 3.5 inches which can contain at least 105 megabytes of data includes an operating mechanism 112 for initiating and controlling the positioning of an actuator arm 176 upon which is mounted a read/write transducer 178, the position of a spindle motor 224 which is used to spin up the disk 42 contained in the cartridge 20 to an operating speed, the locking of the cartridge 20 in the disk drive 100 in an operating mode and the ejection of the cartridge 20 from the drive 100. The operating mechanism 112 can function to eject the cartridge 20 whether or not the drive 100 is powered up in order to be able to remove the cartridge 20 and transport it to another disk drive 100 or to a secured location.

11 Claims, 24 Drawing Sheets

U.S. PATENT DOCUMENTS

| | | | |
|---|---|---|---|
| 4,530,081 A | 7/1985 | Sakurai et al. | 369/75.2 |
| 4,636,891 A | 1/1987 | Barski | 360/97.02 |
| 4,683,506 A | 7/1987 | Toldi et al. | 360/105 |
| 4,717,981 A | 1/1988 | Nigam et al. | 360/133 |
| 4,722,012 A | 1/1988 | Toldi et al. | 360/105 |
| 4,864,452 A | 9/1989 | Thompson et al. | 360/133 |
| 4,979,065 A * | 12/1990 | Ikebe et al. | 360/133 |
| 5,204,793 A * | 4/1993 | Plonczak | 360/97.01 |
| 5,218,503 A * | 6/1993 | Martin | 360/133 |
| 5,262,918 A | 11/1993 | Tannert | 360/133 |
| 5,398,141 A | 3/1995 | Tannert | 360/133 |
| 5,422,775 A * | 6/1995 | Martin | 360/133 |

* cited by examiner

FIG.—9

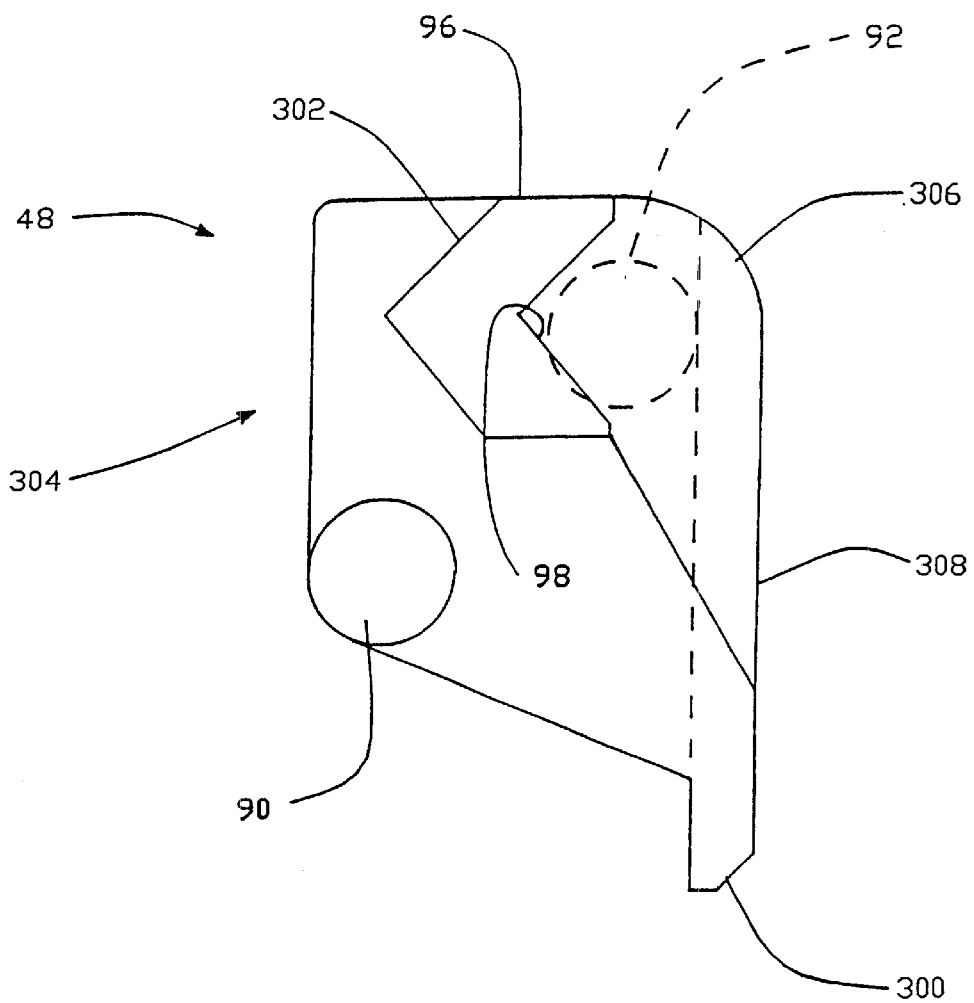
FIG.—14

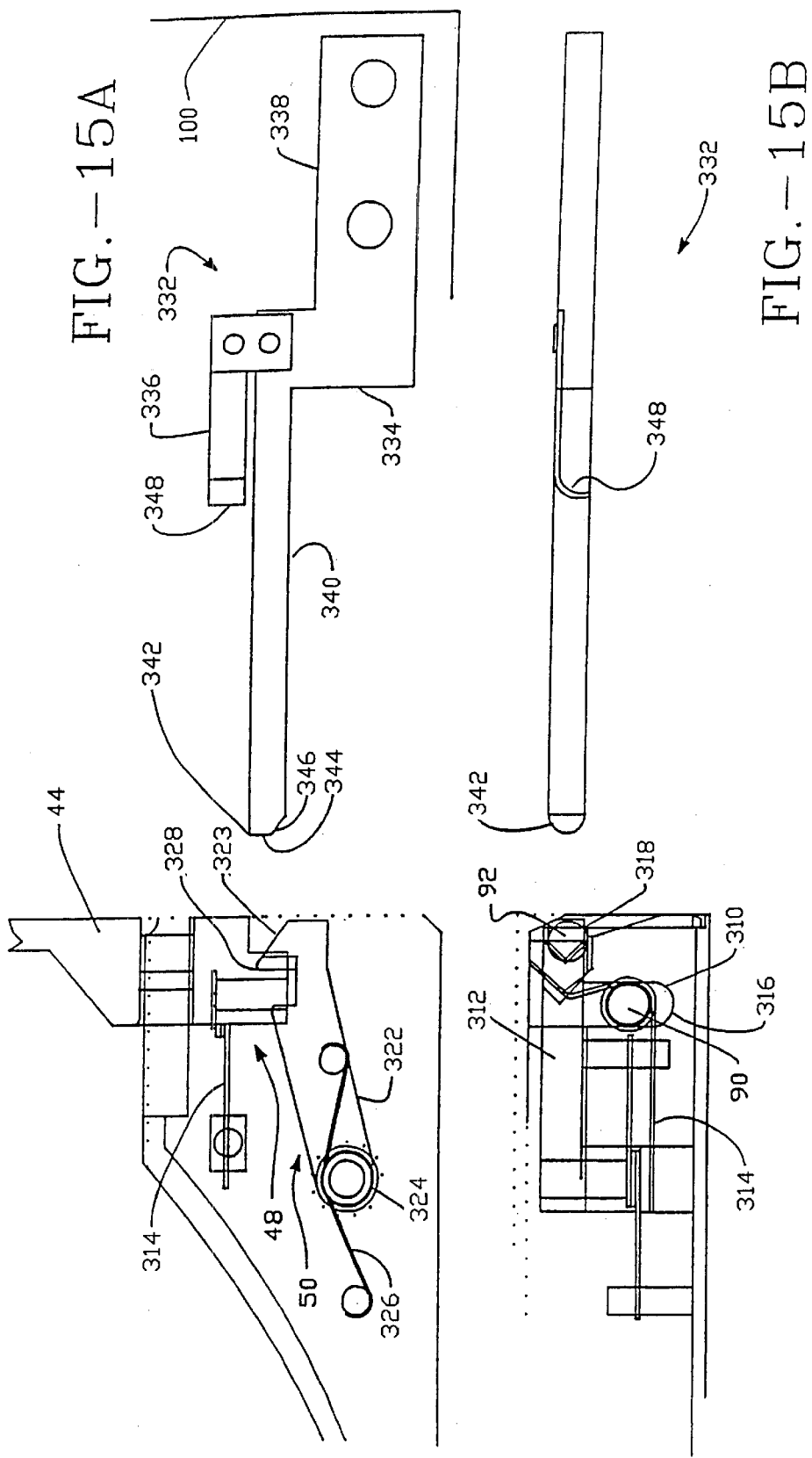

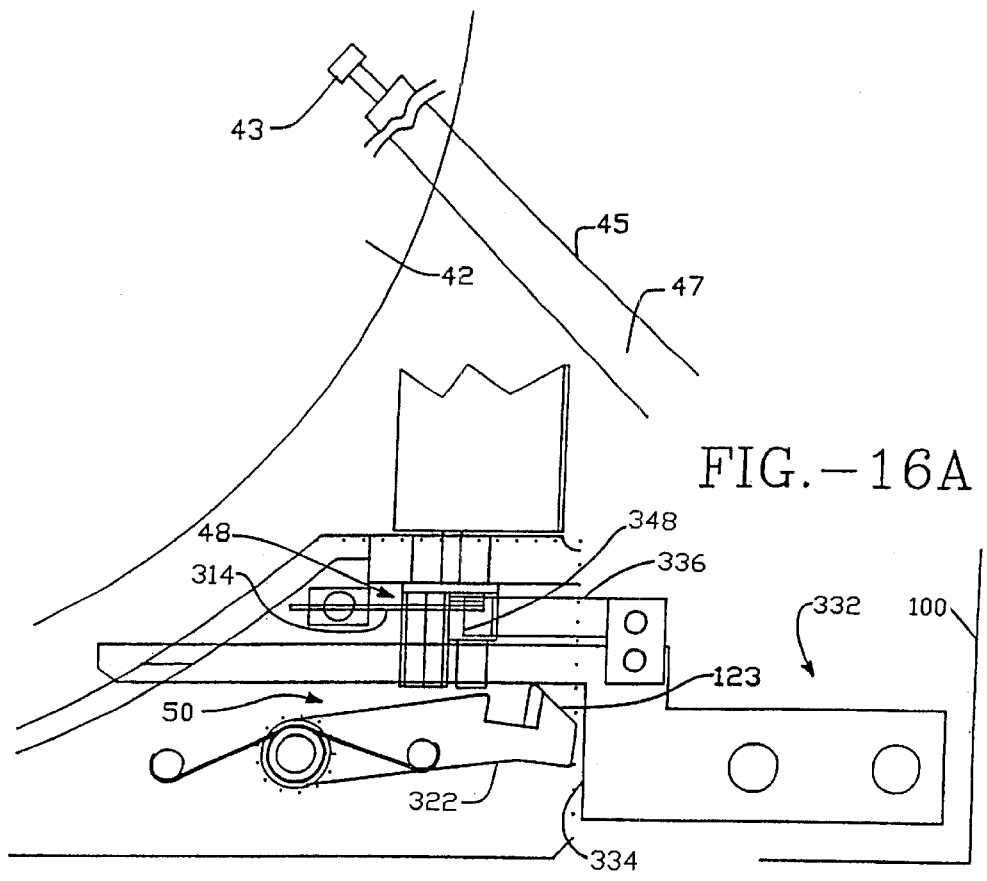
FIG.—16A
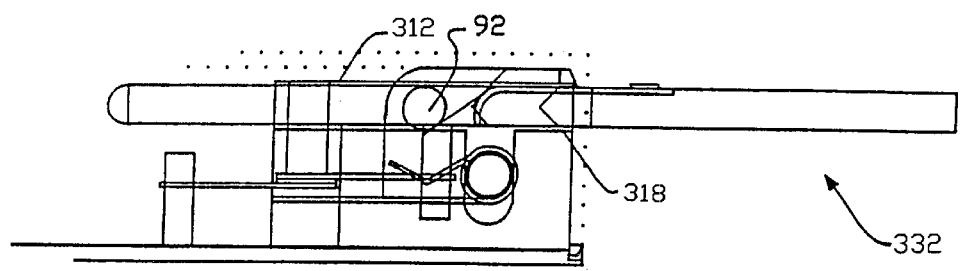
FIG.—16B

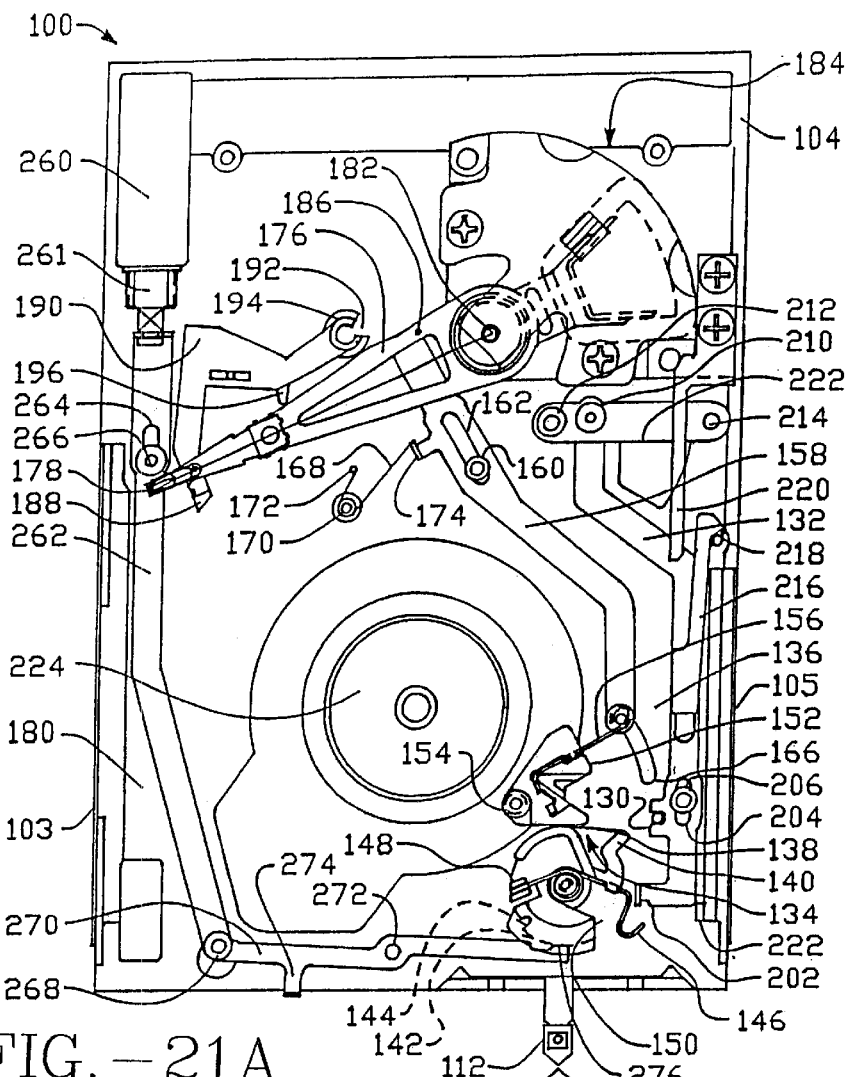
FIG.—21A
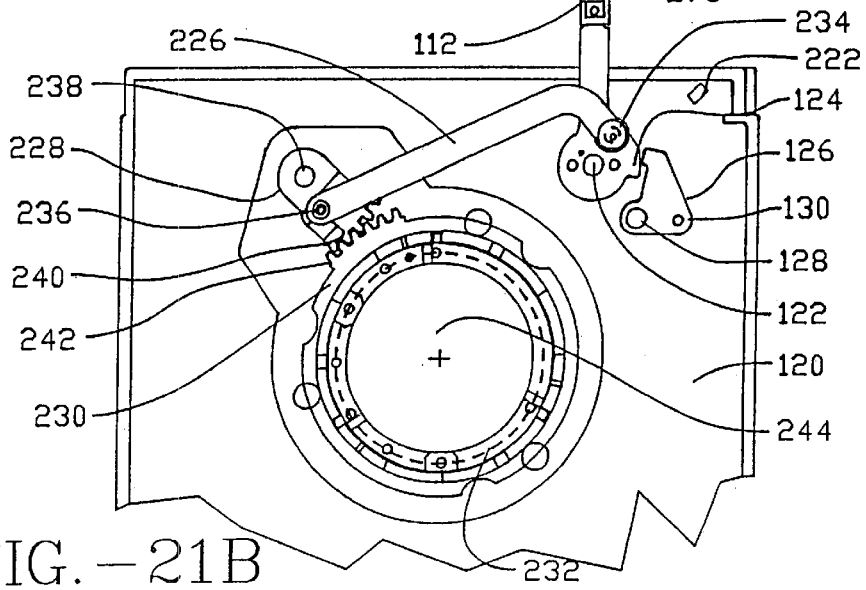
FIG.—21B

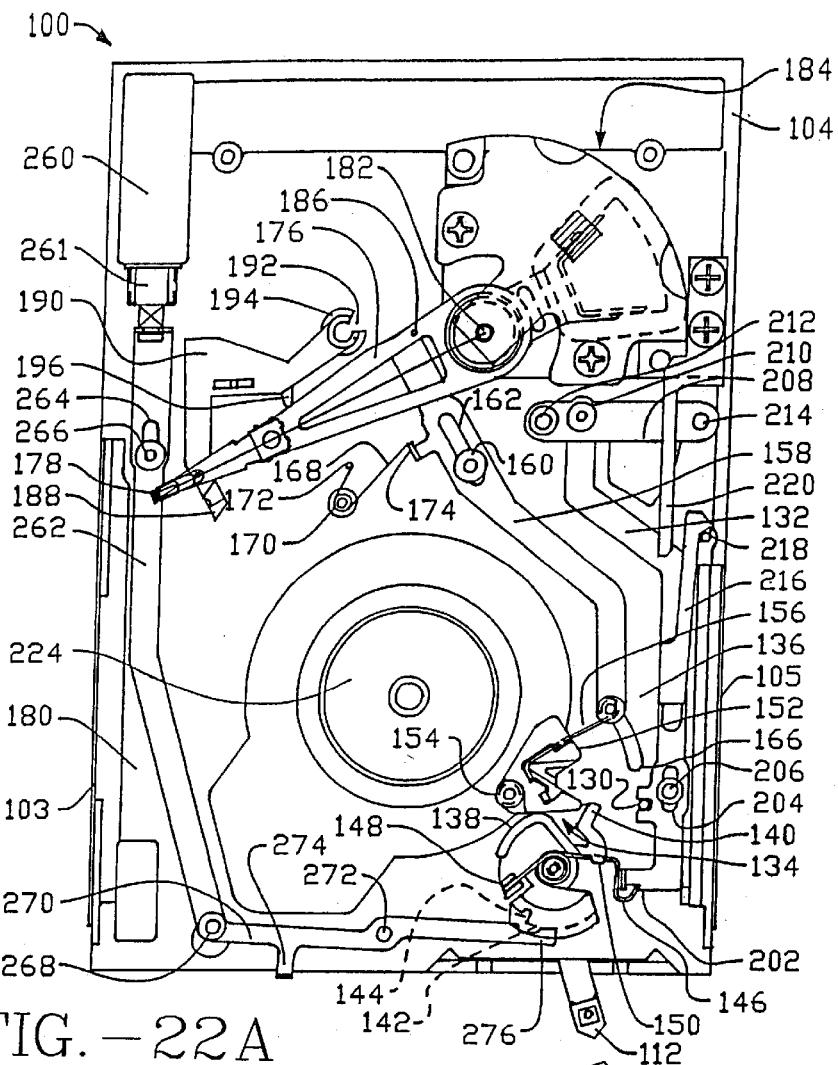
FIG.—22A
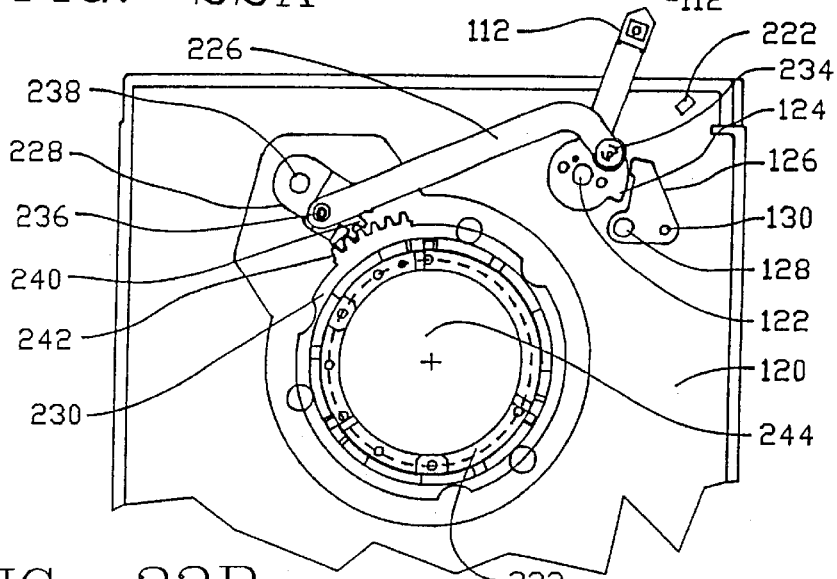
FIG.—22B

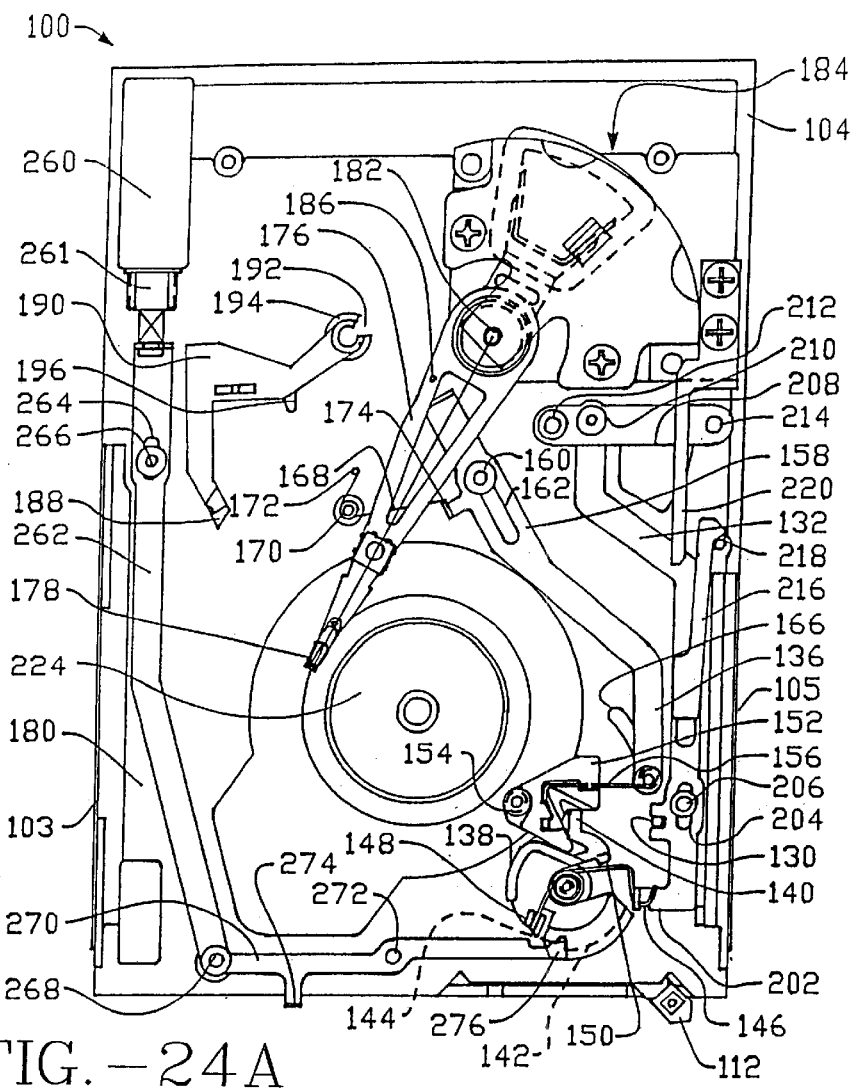
FIG.—24A
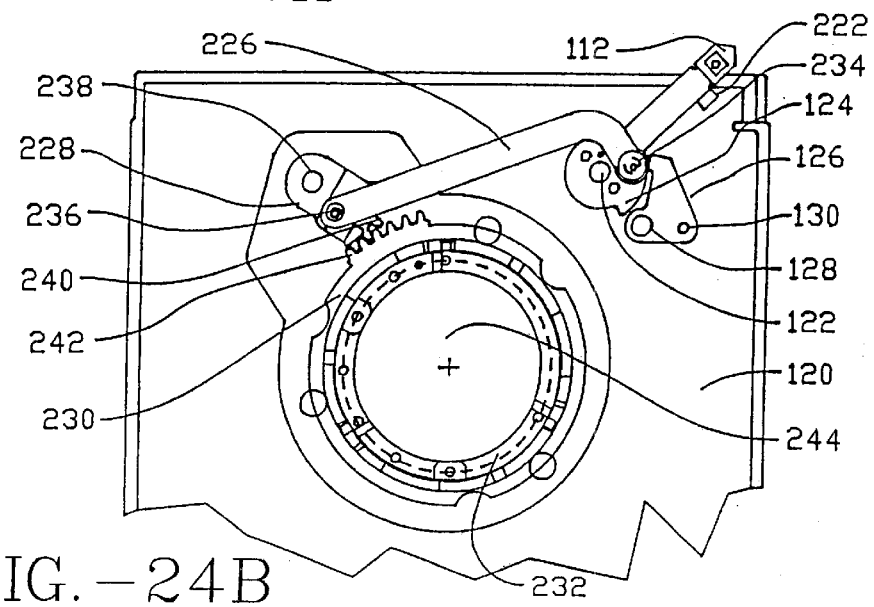
FIG.—24B

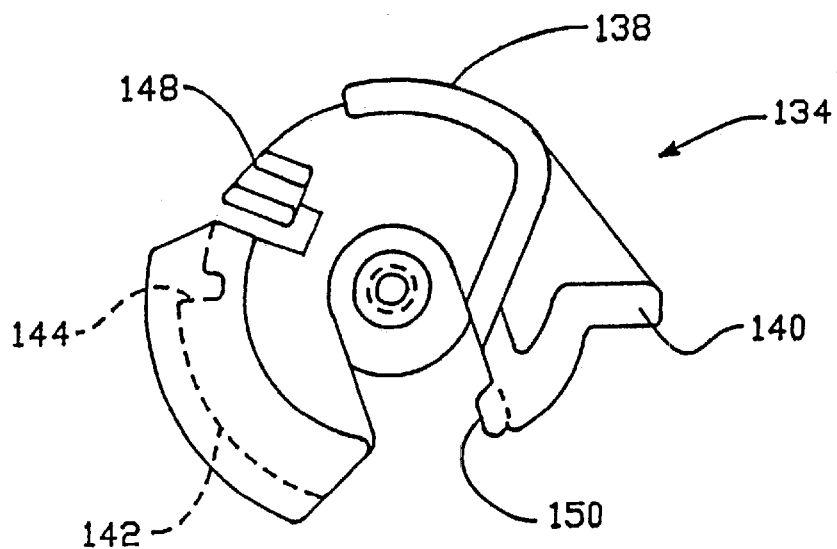
FIG.—25A
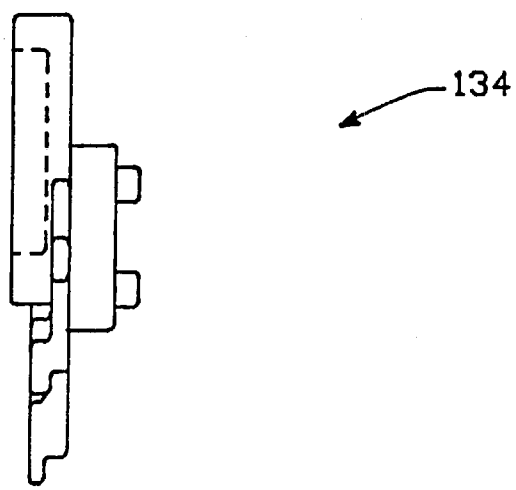
FIG.—25B

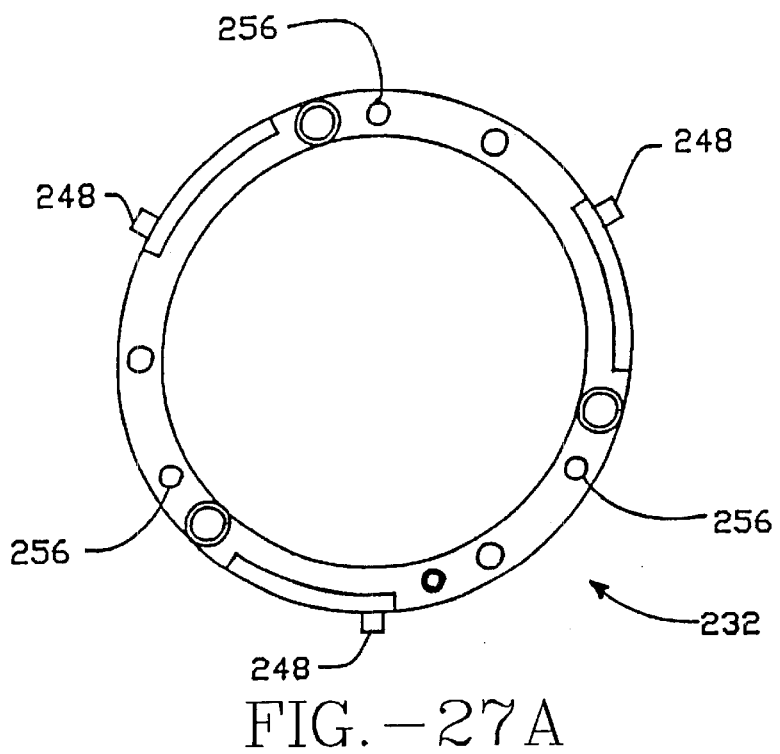
FIG.—27A
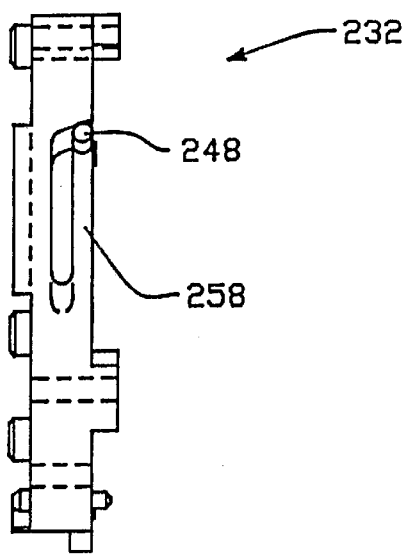
FIG.—27B

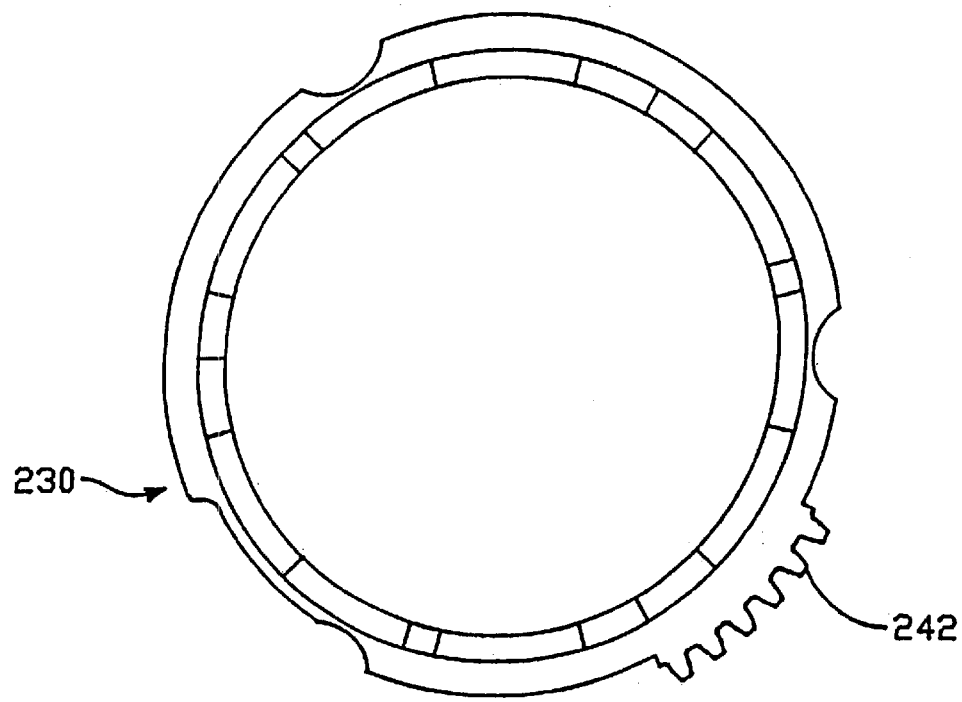
FIG. —28A
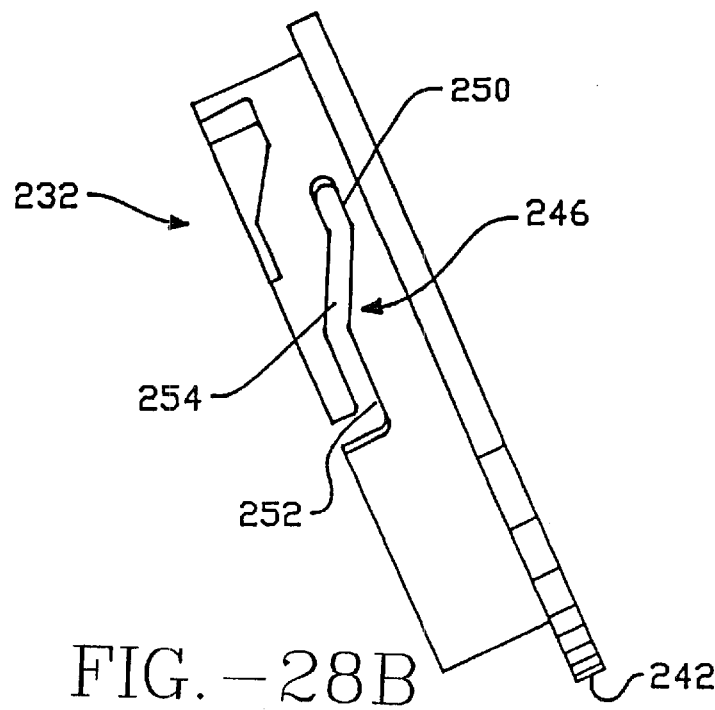
FIG. —28B

REMOVABLE CARTRIDGE DISK DRIVE WITH A RECEIVER FOR RECEIVING A CARTRIDGE HOUSING A HARD DISK

This is a continuation of application(s) Ser. No. 08/334,609 filed on Nov. 4, 1994, now abandoned, which is a continuation of application Ser. No. 08/140,218 filed on Oct. 19, 1993, now abandoned, which is a continuation of application Ser. No. 07/850,683 filed on Mar. 10, 1992, now abandoned, which is a continuation-in-part of Ser. No. 07/779,060 filed Oct. 18, 1991 now U.S. Pat. No. 5,218,503.

RELATED CASE

This case is related to a case entitled "3-½ INCH REMOVABLE CARTRIDGE FOR A DISK DRIVE" which was filed on Oct. 18, 1991 and given U.S. patent application Ser. No. 07/779,060, now U.S. Pat. No. 5,218,503, which patent and application are assigned to Syquest Technology, Inc., the present assignee; and which patent and application are incorporated herein by reference. Claim is made to the priority of the filing date of this related patent and application to the full extent allowed by the U.S. patent law.

FIELD OF THE INVENTION

The present invention is directed to a removable cartridge disk drive capable of selectively receiving a cartridge containing a disk for storing data which disk can be accessed by the disk drive for writing data to the disk and reading data from the disk.

BACKGROUND OF THE INVENTION

As the demand for smaller, portable and more powerful computers accelerates, less and less space can be afforded to disk memory storage. However, higher memory capacities are desired for this ever-shrinking form factor. One method of accomplishing higher memory capacities is to provide for a removable cartridge disk drive such that any number of removable cartridges can be used to store as much data as is required for use with the computer. Additionally, this data can be secured in a safe location remote from the computer in order to ensure the confidentiality of the data when the computer is not in use.

In order to accommodate the ever-decreasing form factor desirable for the configuration of a hard disk drive, there is a need to make both the removable cartridge and the disk drive as compact as possible yet offer a cartridge and disk drive design which can operate repeatedly and reliably in order to have the cartridge accepted into the disk drive and allow the disk drive to access data stored in the cartridge.

In such a removable cartridge disk drive, it is desirable to have as few moving parts as possible and to have these parts coordinated and synchronized in such a way that the loading and unloading of the cartridge and the accessibility of the data by a read/write head or transducer mounted in the disk drive is efficiently accomplished. It is further desirable to have the movement of the parts coordinated in such a manner that the entire operation of the disk drive can be performed with as few as possible operating levers or mechanisms for the user to be concerned with.

In order to accommodate the ever decreasing form factor desirable for the configuration of a hard disk drive, there is a need to make the cartridge as compact as possible yet allow for an appropriate door mechanism enabling the read/write heads from the disk drive to enter the cartridge and to unload onto the disk containing the data.

In addition, there needs to be a cartridge configuration that cannot be inadvertently inserted into the drive in an incorrect manner and which can be positively interlocked with the drive. Thus, proper alignment is accomplished with the heads with respect to the disk so that the heads can be loaded onto the disk without damage to either the heads or the disk.

In addition, the cartridge, by its very nature, needs to have a port for access by the read/write head. This port needs to be as large as possible in order to allow access by the heads and also not to restrict the design of the head actuators and the drive itself.

The disk contained in the cartridge is mounted on a hub, which hub is provided through a port in the cartridge so that it can be engaged with the spindle motor of the drive, in order to impart rotational movement to the disk. As the cartridge is not hermetically sealed from the outside environment, there needs to be provided a mechanism for minimizing environmental contamination from collecting in the cartridge and causing interference between the head and disk, and potentially damage to the head or data on the disk.

SUMMARY OF THE INVENTION

The present invention is directed to a removable cartridge disk drive which can preferably receive a removable cartridge housing a disk which has a diameter of about 3.5 inches or less and which contains about 105 megabytes of data or more and meet all of the below-listed objectives.

Accordingly, it is an object of the present invention to provide for a disk drive which is compact and has as few moving parts as possible, the functioning of such moving parts being coordinated by as few user manipulated levers or controls as possible.

It is an object of the present invention to provide for an operating mechanism which can control the loading and unloading of the cartridge with respect to the disk drive as well as the engagement of a spindle motor to cause the disk inside of the disk drive to spin.

Further, it is an object to provide for the operating mechanism to control the position of the read/write transducer which is located on an actuator arm. The transducer should be positioned out of the way when the cartridge is being inserted and removed, but allowed to project through an opening in the cartridge loaded in the drive in order to access data from a disk.

Further, it is an object of the present invention to have the operating mechanism control the locking of the cartridge into the disk drive and the ejection of the cartridge from the disk drive in a manner such that the read/write transducers and the disk, and the data stored on the disk are not compromised or damaged in any respect.

Additionally, it is an object of the present invention to have all of the above functions principally performed by a single operating mechanism which is convenient for the user to use and which can be performed by the user in a logically sequenced manner.

The present invention is directed to accomplishing the needs recognized in the prior art.

In accordance with the invention, a removable cartridge for a disk drive includes a housing, a data storage disk, a mechanism for rotatably mounting the disk in the housing, and a housing door. The cartridge further includes a device for removably mounting the door relative to the housing so that the door is removable between a closed position and an open position. With the door in the open position, the door is positioned in a plane which is parallel to the disk and located substantially within the housing.

With such a configuration, with the door received in a plane parallel to the disk, the opening port uncovered by the door can be larger than openings with prior art cartridges. With an enlarged port, the heads can have increased access to the disk in the cartridge allowing for greater freedom of the design of the drive. Further, with the door received in the housing of the cartridge itself, the cartridge receiver defined by the disk drive can be reduced in size by the size of the door and thus the overall dimensions of the drive can be reduced.

In another aspect of the invention, the device for removably mounting the door includes a first surface which is adapted for engaging a finger from the drive in order to cause the door to pivot from the close to the open position and a second surface which engages a second finger from the drive in order to hold the door in the open position once it has been inserted into the drive.

In addition, the cartridge includes a locking device for locking the mounting device with the door in the closed position. Upon insertion into the drive, the finger of the drive causes the locking mechanism to unlock the mounting device so that the door can be pivoted by the finger to the open position.

In another aspect of the invention, the cartridge includes a recess which extends along and then across the direction of insertion of the cartridge into the drive in order to lockingly engage the cartridge in the drive. The recess is located immediately adjacent to the mounting device for the door so as not to reduce the available space for the port through the cartridge for allowing access by the heads.

In another aspect of the invention, the cartridge includes a beveled surface which is opposite the groove for assisting in the proper insertion and registration of the cartridge in the receiver of the drive. Still further, the cartridge includes tabs extending from the back thereof in order to prevent, along with the beveled surface, the cartridge from being inserted in an improper orientation.

The cartridge further includes recesses along the side thereof for purposes of allowing the cartridge to be handled by a mechanical feeding mechanism for insertion and removal from the drive.

In another aspect of the invention, the internal surface of the cartridge housing includes spiral fins for causing air to be pumped toward the hub. During the normal operation of the drive, with the disk spinning at a high rate of angular velocity, the disk tends to draw air from the space about the cartridge receiver through the annular opening between the hub and the cartridge and into the cartridge, potentially exposing the heads and/or the disk to contamination and damage. The spiral fins cause air to flow toward the hub and counter or stagnate the ability air and contaminates to be drawn into the cartridge interior adjacent to the hub.

From the above, it can be seen that the present invention addresses the concerns with respect to the prior art and provides for a cartridge with the desired form factor.

The present invention also includes a removable cartridge disk drive for receiving a cartridge containing a disk for storing data and mounted for rotation inside of the cartridge. The disk drive includes a housing and a receiver for receiving a cartridge in the housing. Further, the disk drive includes an actuator arm mounted in the housing for moving a read/write transducer relative to a cartridge received in the receiver in order to transfer data between the transducer and the disk in the cartridge. The disk drive includes a spindle motor mounted in the housing and adapted for causing the disk to spin when the cartridge is received by the receiver.

Further, the disk drive includes a device for transporting the motor between a disk engaging position and a disk non-engaging position and also a device for retracting the actuator arm to a retracted position out of the way a cartridge and for releasing the actuator to a released position so that it can be used to transfer data to and from the disk. The disk drive includes a mechanism for operating the device for transporting the motor and the device for retracting the actuator arm in order to position the motor between the engaging and non-engaging positions and to position the actuator arm between a retracted and released position.

In another aspect of the invention, the operating device is for additionally causing the ejection of the cartridge from the disk drive.

In still a further aspect of the present invention, devices are provided for locking the operating device in a position with the cartridge operably positioned in the disk drive.

In still a further aspect of the invention, all of the above operations are performed in an appropriate sequence by a single operating mechanism with a single operating lever extending therefrom. The operating mechanism includes a lever which can extend out of the housing for operating the disk drive and the operating mechanism includes a pivotally mounted arrangement having several camming and engaging surfaces, which arrangement is pivoted by the lever and which operates the disk drive in accordance with the above description in the desired sequential manner.

BRIEF DESCRIPTION OF THE FIGURES

FIG. 14 depicts a side view of the mounting device of FIG. 13.

FIGS. 15a and 15b depict plane and side views of the door mounting mechanism and lock mechanism, and a composite drive finger mechanism with the cartridge door in the closed position.

FIGS. 16a and 16b depict plane and side views of the door mounting mechanism and lock mechanism, and a composite drive finger mechanism with the cartridge door in the opened position.

FIGS. 21a and 21b depict top and bottom views of the disk drive of FIG. 17 with the housing removed and with the mechanism of the disk drive configured in a motor loaded configuration.

FIGS. 22a and 22b depict top and bottom views of the disk drive of FIG. 17 with the outer housing removed and with the mechanism of the disk drive being urged into the beginning of the actuator arm unlocking sequence.

FIGS. 24a and 24b depict top and bottom views of the disk drive of FIG. 17 with the outer housing removed and showing the disk drive mechanism in a locked position, which is the position required in order to have the read/write transducer successfully engage the disk on a cartridge and transfer data between the transducer and the disk, with in the disk spun up to full operating speed.

FIGS. 25a and 25b depict plan and side views of the operating mechanism of the disk of FIG. 17 of the invention.

FIGS. 27a and 27b depict plan and side views of the motor bearing plate of the invention.

FIGS. 28a and 28b depict plan and side views of the motor ring of the invention which in combination with the motor bearing plates of FIGS. 27a and 27b allow the selective positioning of the spindle motor relative to a cartridge inserted in the disk drive of FIG. 17.

DETAILED DESCRIPTION OF THE PREFERRED EMBODIMENT

Figure 1:
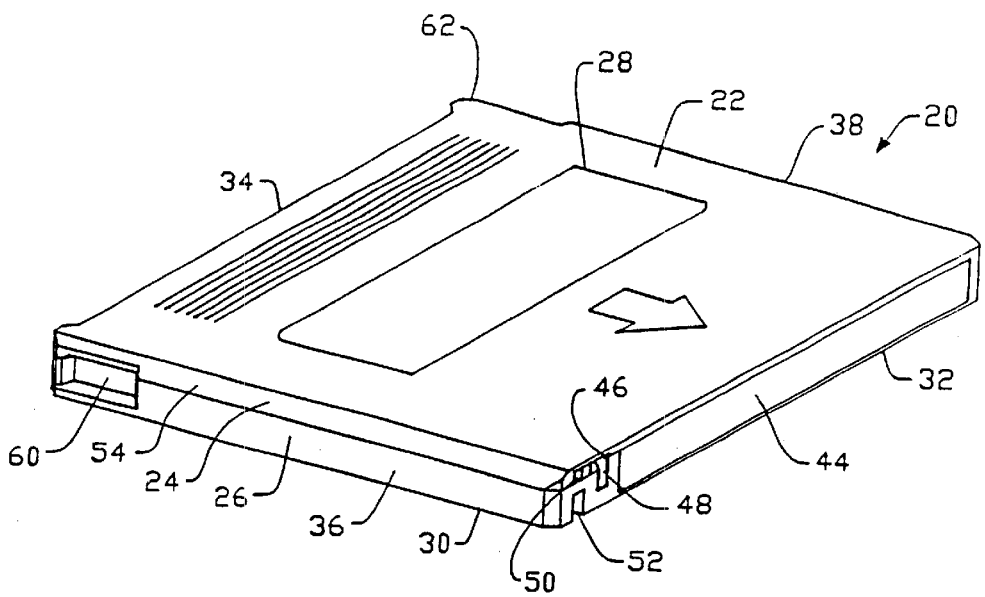
FIG. 1 depicts a perspective view of an embodiment of the cartridge of the invention with the door in the closed position.

With reference to the figures and in particular, FIG. 1, a preferred embodiment of the cartridge 20 is depicted. Cartridge 20 includes an outer housing 22 which includes a top portion 24 which is secured to a bottom portion 26. In a preferred embodiment, these portions are molded out of tough and endurable engineering plastic known in the trade, such as for example, polycarbonates and Lexan. In the preferred embodiment, the top and bottom portions 24, 26 are made of 6355 polycarbonates. The door described hereinbelow is comprised of, in a preferred embodiment, Lexan 920. In a more preferred embodiment, the door will be comprised of a stainless steel substantially rectangular portion which comprises the majority of the door, and which is made of stainless steel to ensure rigidity, with the tabs or hinges 82, 84 (described below) molded of Lexan 920 and simultaneously secured to the stainless portion.

The top portion 24 includes a top surface 28 and the bottom portion 26 includes a bottom surface 30. With the top and bottom portions 24, 26 secured together, the top and bottom portions 24, 26 of the housing 22 define a door or port end 32, a back end 34, and first and second connecting ends 36, 38 which connect the door end 32 with the back end 34. As can be seen in FIG. 1, the top and bottom surfaces 28, 30 are substantially parallel to each other, and a disk 42 contained in the cartridge, with the ends 32, 34, 36 and 38 essentially perpendicular to the top and bottom surfaces 28, 30.

Figure 2:
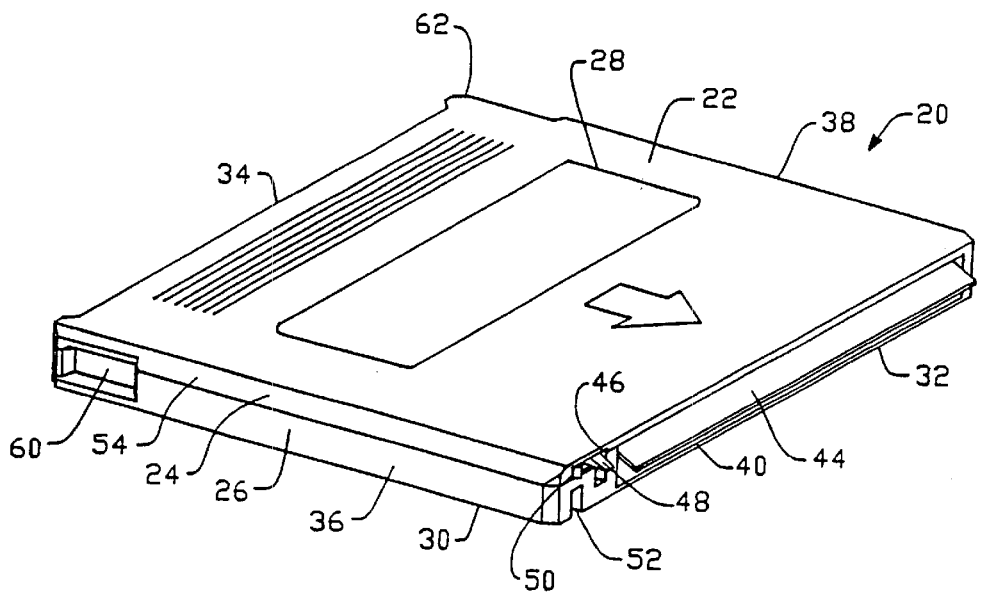
FIG. 2 depicts a perspective view of an embodiment of the cartridge of FIG. 1 with the door in a semi-opened position, between the fully closed and fully opened position.
Figure 3:
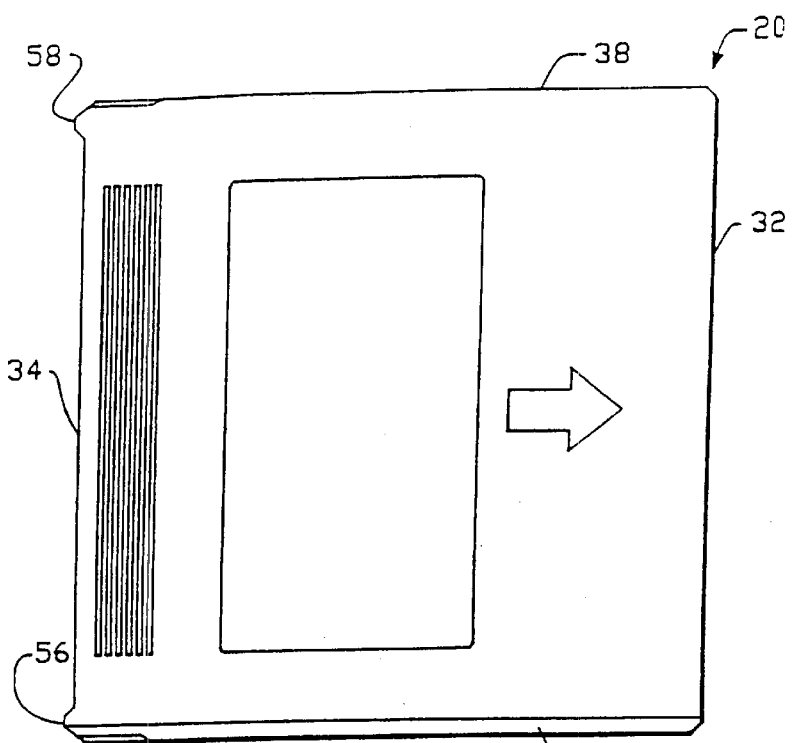
FIG. 3 depicts a plan view of an embodiment of the cartridge of FIG. 1.

The port end 32 defines a port 40 which provides access for read/write transducers so that these transducers can be unloaded by actuator arm onto the disk 42 contained in the cartridge 20. In a preferred embodiment, cartridge 20 includes a single disk 42 which is about 3.5 inches in diameter and can contain 105 megabytes of data on its two planar surfaces. As can be seen in FIGS. 1 and 2, the cartridge door 44 is mounted adjacent the port 42 such that the door can be positioned from a closed position as shown in FIG. 1, completely closing off port 40, and therefrom move to a partially or semi-open position as shown in FIG. 2, and finally to a fully opened position.

Figure 8:
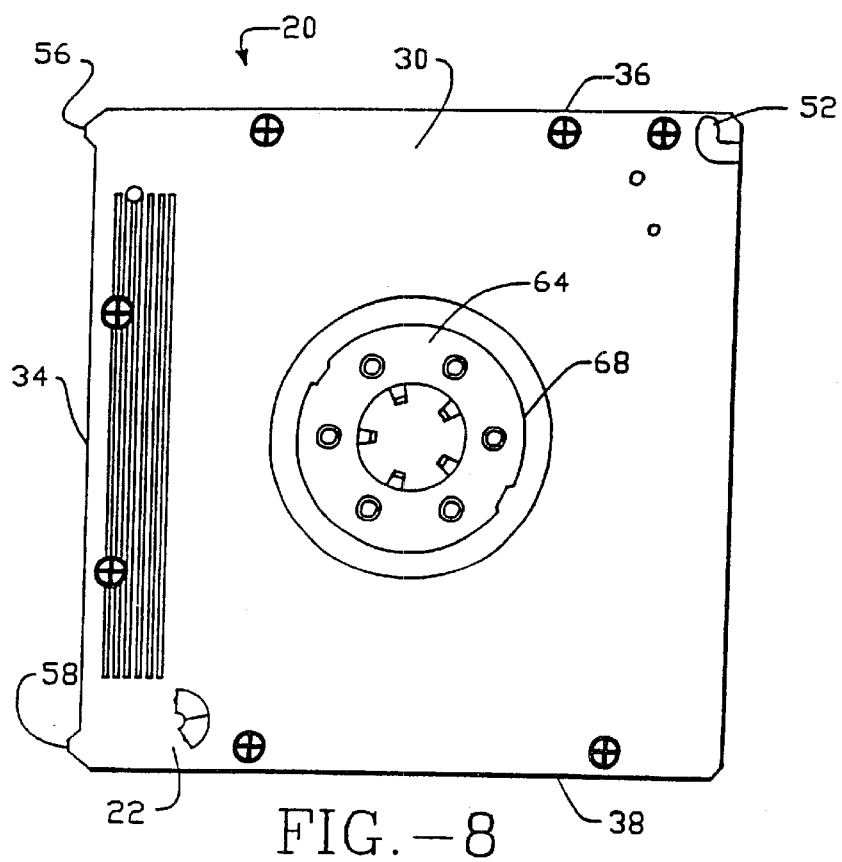
FIG. 8 depicts a bottom plan view of the embodiment of the cartridge of the invention of FIG. 1.

As can be seen in FIGS. 1 and 2, immediately adjacent to the left of the door 44 is an L-shaped slot 46 which allows access to a door mounting mechanism and a door locking mechanism. Immediately below the L-shaped slot 46 is, as can be seen in FIGS. 1, 2 and 8, a J-shaped groove 52. The J-shaped groove 52 extends through the door end 32 and then rearwardly and outwardly. The J-shaped groove 52, as will be explained further hereinbelow, accepts a member from a disk drive in order to have the cartridge interlockingly received in the drive. Such a mechanism is contemplated in U.S. patent application Ser. No. 07/722,837, entitled "REMOVABLE CARTRIDGE DISK DRIVE WITH AN INTERLOCKING MECHANISM FOR A DISK DRIVE" and filed Jun. 28, 1991, which application is assigned to the present assignee of this case and is incorporated herein by reference. Adjacent to the location of the L-shaped slot 46 and opposite the J-groove 52 and defined through the top surface 28 and the first end 36 is a beveled portion 54 which extends the length of the first end 36. This beveled portion 54 is compatible with a slanted portion of the disk drive door opening which receives the cartridge in order to ensure that the cartridge is inserted into the drive in the proper orientation and that the cartridge is properly registered in the drive so that the heads can be unloaded onto the disk.

As can be seen in FIGS. 1, 2, 3 and 8 cartridge 20 includes tabs 56, 58 which extend from the back end 34 of the housing 22. These tabs 56, 58 ensure that the length of the cartridge 20 from the door end 32 to the back end 34 is longer than the width of the cartridge 20 which is defined as the distance between the first and second ends 36, 38 in order to ensure that the cartridge cannot be inserted sideways into the drive.

The housing 22 further defines first and second recesses 60, 62 which can be used to grab the cartridge with either human or mechanical fingers in order to select the cartridges from a library and insert the cartridge into the drive.

The design of the cartridge 20 has been accomplished in order to maximize the size of the port 40 and to advantageously position the door 44 in the door open position so that the actuator arm and heads of the disk drive will have maximum exposure to the disk contained in the cartridge 20. To this end, the door 44 was designed to be received substantially above and in the plane parallel to the disk 42. Further, the door is received in the open position substantially within the housing 22 of the cartridge 20. Thus, this design does not add to the overall length of the cartridge with the door in the open position and accordingly, reduces the length of the cartridge receiver in the drive. With the door received in the cartridge, the pivot point, which is fixed to the drive, of the actuator arm can be positioned closer to the center of the rotation of the disk. This provides for a compact design and optimizes the performance of the head with respect to the tracks on the disk. The reason for this is that with a rotary actuator arm the angle with respect to which the head addresses the various tracks is more consistently tangential across the range of tracks and further the geometry of the actuator arm in relationship to the disk causes the heads to fly above the disk in a more consistent and constant flying height with increased accuracy for the read/write operation of the head. Further with the door fully received in the open position in the cartridge, there is less possibility that damage can be done to the door as it is being received in the disk drive. This arrangement in part accounts for the ability to store at least 105 megabytes of data on a disk which is about 3.5 inches in diameter or less.

Further, in order to maximize the port 40, the L-shaped slot 46, through which access can be obtained to the door mounting mechanism and door locking mechanism, is located to the left of the door port 40. Immediately adjacent to the slot 46 is the bevel 54, and immediately therebelow through the bottom surface 30 is defined the J-shaped groove 52. With the L-shaped slot 46, the bevel 54, and the J-shaped groove 52 so positioned, the door 44 can extend rightwardly therefrom substantially the full length of the door end 32, to immediately adjacent the connecting side 38. With the bevel 54 extending through the top surface 28 opposite to the J-groove 52, the cartridge can be positively registered in the receiver of the drive with a member from the drive engaging and lockingly being received in the J-groove 52 and with the bevel 54 mating to a mating beveled surface in the cartridge receiver of the drive.

As can be seen in FIG. 8, the cartridge 20 includes a hub 64 to which the disk is mounted. Mounted onto hub 64 is an armature plate 65 which contacts the spindle motor of the disk drive. A portion of the hub 64 and the armature plate 65 is received through a port 66 defined in the bottom surface 30 of the housing 22. Disposed in the hub 64 are a plurality of five downwardly depending teeth 68 which are urged apart as they are received over a spindle hub as is known in the trade.

Figure 9:
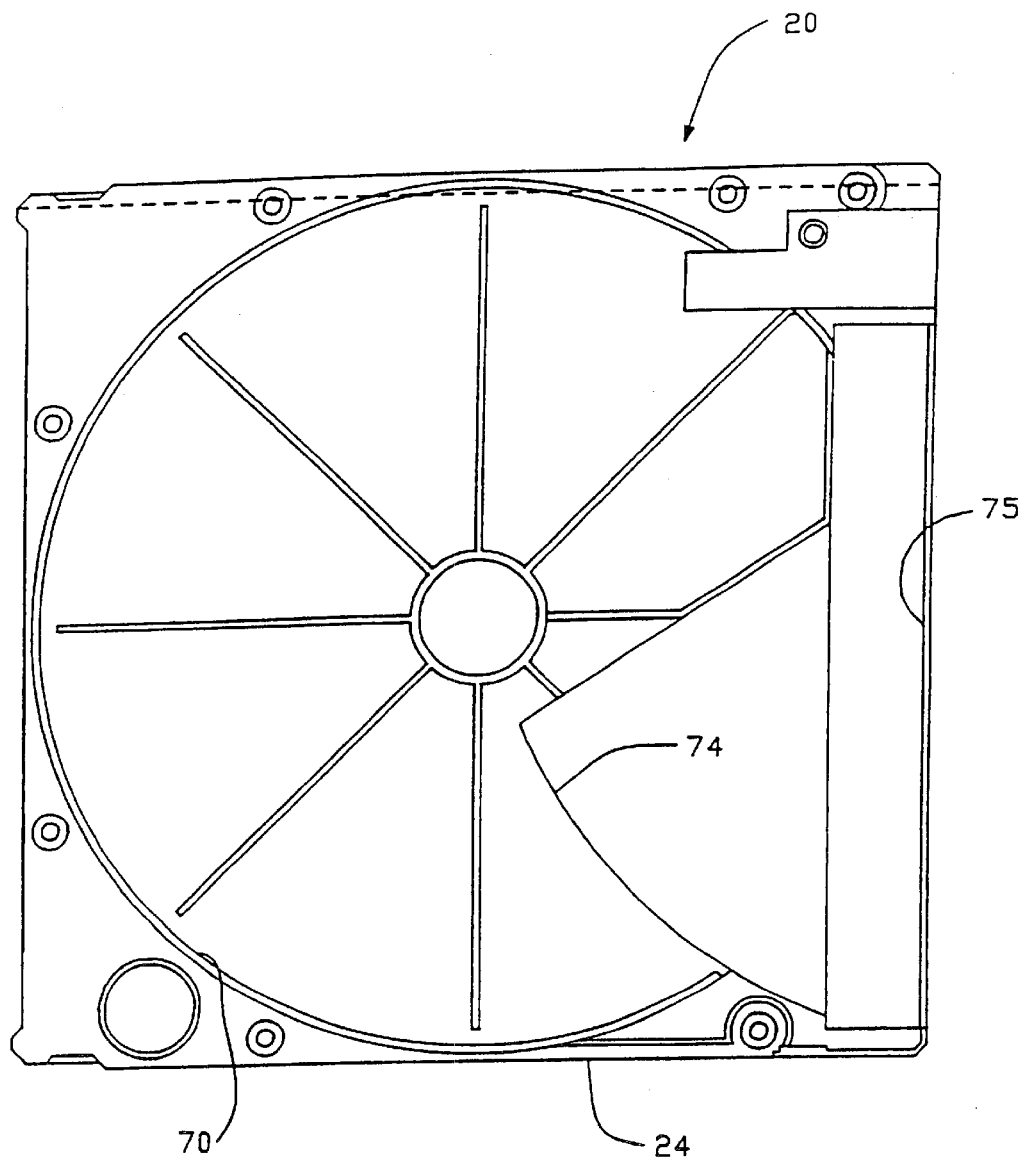
FIG. 9 depicts an internal surface for the top of the cartridge of FIG. 3.
Figure 10:
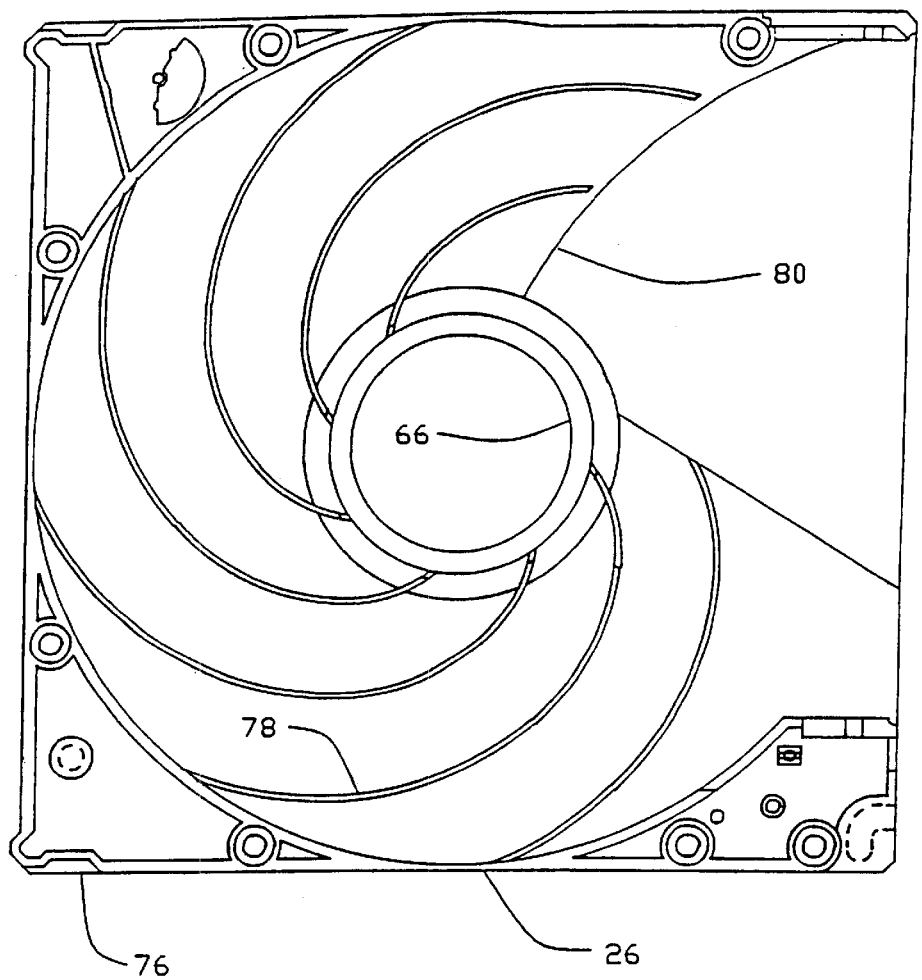
FIG. 10 depicts an internal surface for the bottom of the cartridge of FIG. 8.

Turning to FIGS. 9 and 10, the top portion 24 and bottom portion 26 are depicted. In FIG. 9, the internal surface 70 of the top portion 24 is depicted. This internal surface 70 includes a plurality of radial fins 72 which provide structural support for the top portion 24 and additionally act as a baffle to retard the flow of air as the disk is spinning. As can be seen in FIG. 9, a substantially triangular shaped recess 74 is provided adjacent a rectangular door receiving recess 75 in the inner surface 70 in order to allow additional clearance for receiving the actuator arms and heads mounted thereon as the heads are unloaded onto the disk.

FIG. 10 depicts the inner surface 76 of the bottom portion 26. This inner surface 76 defines a plurality of inwardly spiraling fins 78 which end at the hub port 66. These fins 78 are designed to act as a centrifugal pump, forcing air from inside of the housing to the hub 64 and port 66 in order to counteract the tendency of the spinning disk to draw air, along with contaminating particulate, from the outside of the cartridge through the port 66 into the cartridge. In a preferred embodiment, the plurality of the spiraling fins 78 are disposed such that fins 78 spiral inwardly toward port 66 substantially in the direction of rotation of the disk mounted on the hub. Further, as can be seen in FIG. 10, a triangular recess 80 is defined in the internal surface 76 in order to provide additional clearance for the actuator arms and heads to be received within the housing.

Figures 4, 5:
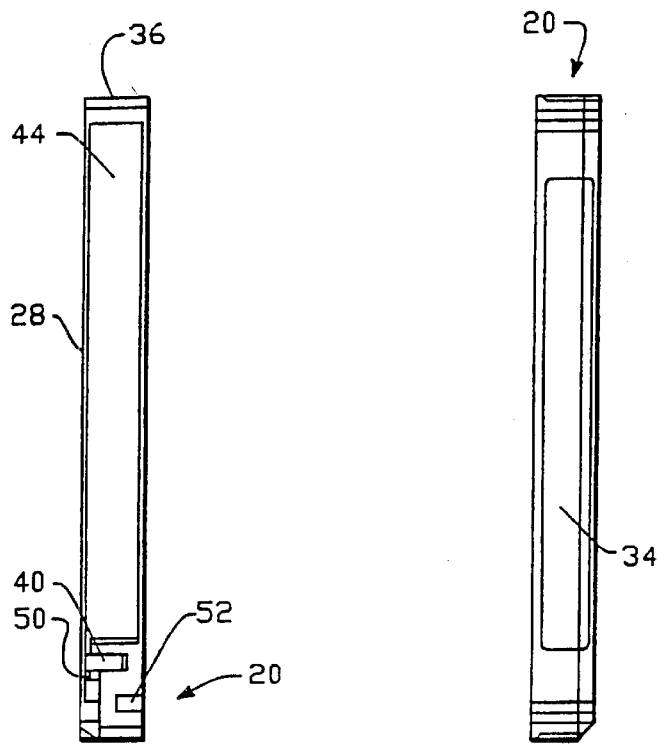
FIG. 4 depicts a door end view of an embodiment of the cartridge of FIG. 1.
FIG. 5 depicts a back end view of an embodiment of the cartridge of FIG. 1.
Figure 6:
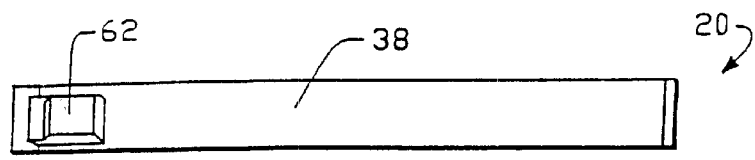
FIG. 6 depicts a right end view of an embodiment of the cartridge of FIG. 1.
Figure 7:
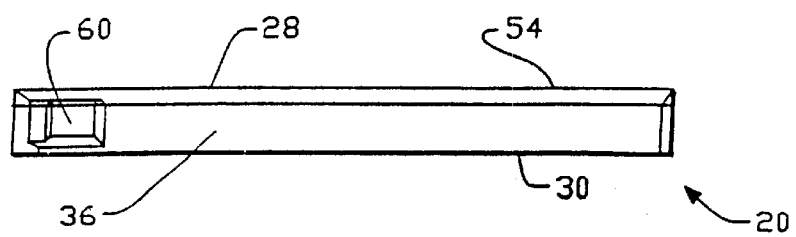
FIG. 7 depicts a left end view of an embodiment of the cartridge of FIG. 1.
Figures 11, 12:
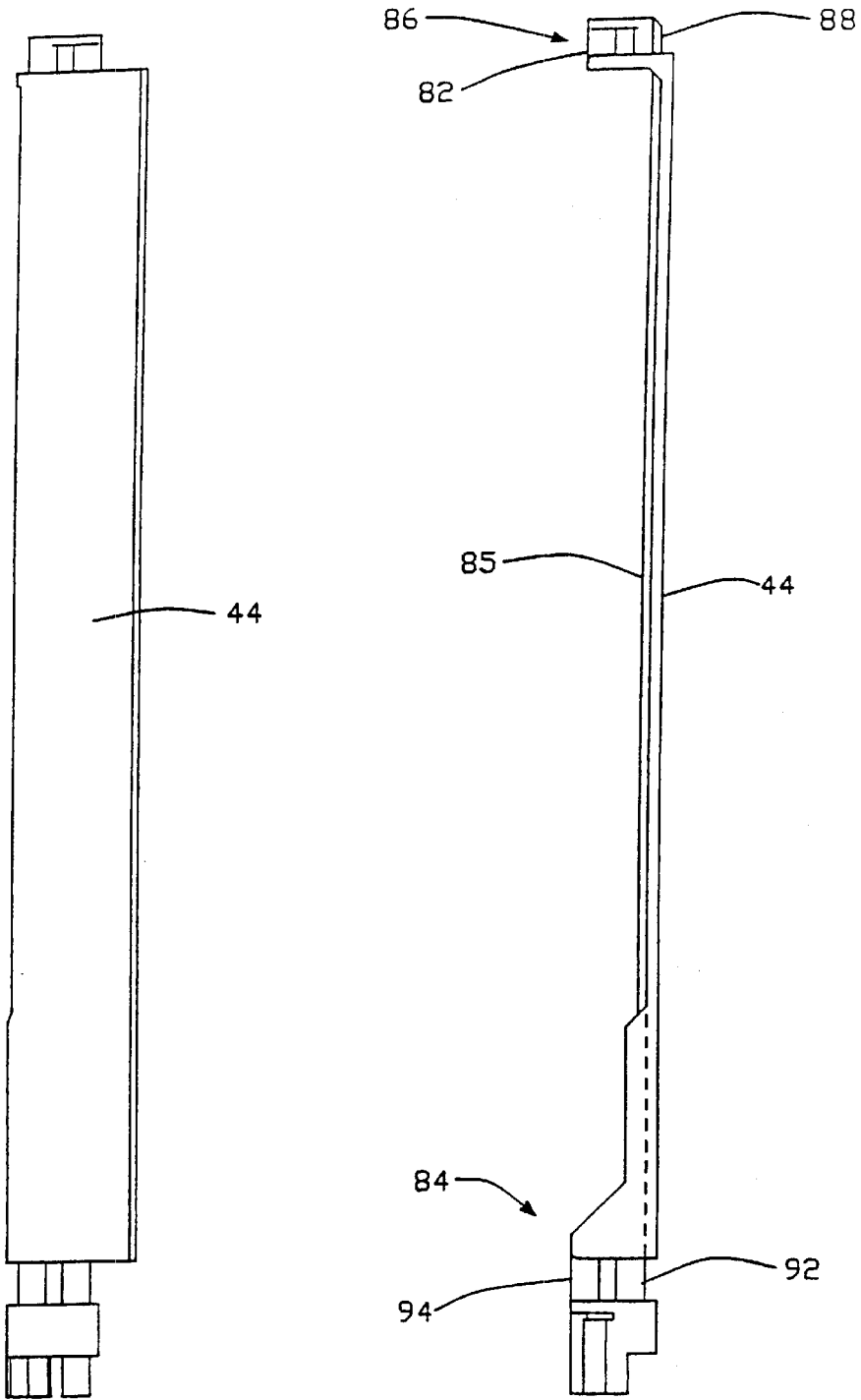
FIG. 11 depicts a front view of the door of the embodiment of FIG. 1.
FIG. 12 depicts a top view of a door of the embodiment of FIG. 11.
Figure 13:
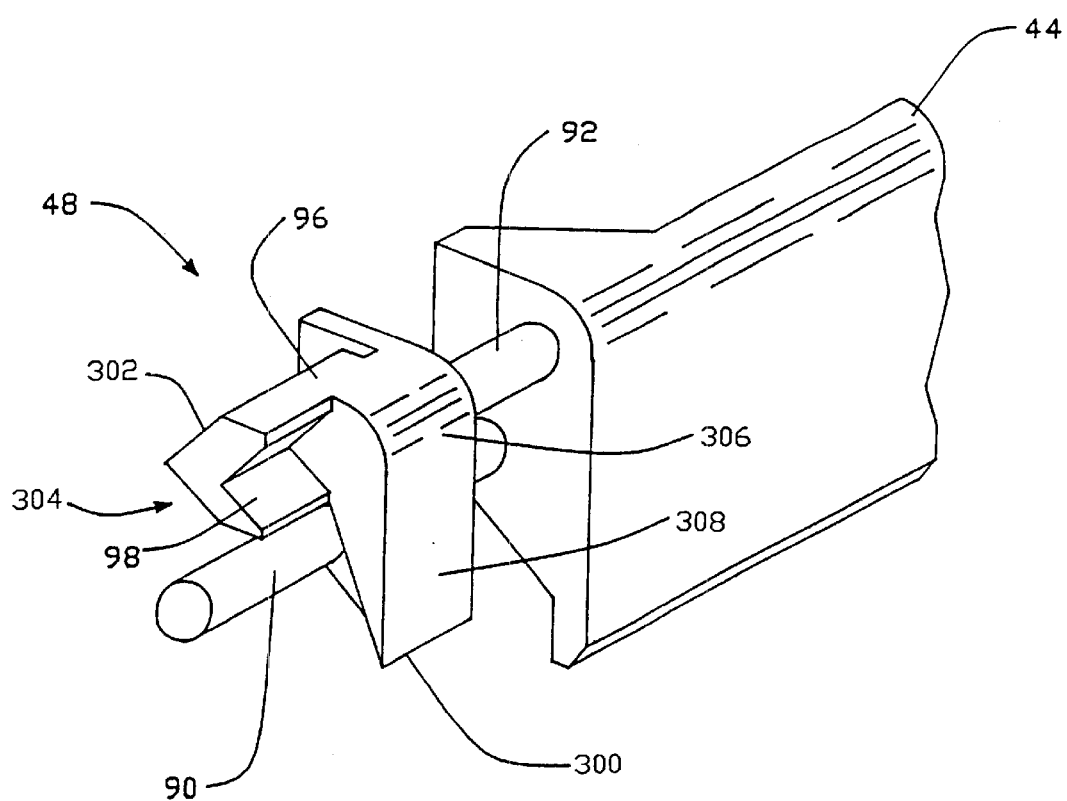
FIG. 13 depicts a perspective view of a portion of the mounting device for the door of an embodiment of the invention of FIG. 1.

Turning to FIGS. 11, 12 and 13, various views of the door are presented. The door 44, as can be seen in FIGS. 4, 11 and 12 is an elongate rectangle. In a top view, as can be seen in FIG. 12, the door is substantially "U" shaped being so defined by tabs 82, 84 extending perpendicularly and rearwardly therefrom. Extending from tab 82 are first and second pins 86, 88. Extending from tab 84 are first and second pins 90, 92. Pins 90, 92 form part of the mounting mechanism 48 which allows the door 44 to move from a closed position to an open position where the door 44 is position in a plane substantially parallel to the plane of the disk. In addition to the other embodiment, which include a solid one-piece casting of a material such as Lexan and in a more preferred embodiment with the door itself being made out a rigid stainless steel portion with the tabs or hinges 82, 84 being comprised of molded Lexan 920, and in a less preferred embodiment which can include a door which is stiffened with an elongated rectangular metallic insert 85. This insert is glued to the back of the door which is, for example, made out of Lexan, as is shown in FIG. 12.

Mounting mechanism 48 includes a body 96. As can be seen in FIG. 13, second pin 92 extends only between the body 96 and the door 44. First pin 90 extends on both sides of the body 96. Body 96 includes a first surface 98 for receiving a finger mechanism (described below) from the drive 100 for causing the door 44 to pivot to the open position and a second surface 300 for also receiving the finger mechanism for ensuring that the door 44 is held in the open position. As can be seen in FIG. 13, the first surface 98 in the preferred embodiment is substantially "V" shaped and concave. A complementary "V" shaped and convex third surface 302 is defined adjacent to the first surface 98 by another portion of the body 96. The surfaces 98, 302 define a substantially chevron shaped engagement portion 304, which engagement portion 304 will be engaged by the locking mechanism 50 described hereinbelow which is used to lock the door 44 in the closed position of FIG. 1.

As can be seen in FIG. 13, the second surface 300 is disposed about 90 degrees from the first surface 98. Thus as the door 44 is urged to the open position, the second surface 300 comes into engagement with the finger mechanism of the disk drive in order to bias the door to a more open position. Thus, it is to be understood that the first finger opens and holds the door in an opened position with the second finger, in a preferred embodiment, biasing the door an additional one or two degrees to a more open position. As can be seen in FIG. 13, in order to allow the body 96 to clear the interior surface 70 of the top portion 24, a curved portion 306 is provided which extends from adjacent the first surface 98 to a flat portion 308 which extends to the second surface 300.

For the embodiment shown in FIG. 13, the pin 92 is located upwardly and toward the door 44 from the first pin 90. Further, the first surface 98 is located in a plane which is offset from a plane of the second surface 300 which accounts for the about 90 degree separation discussed above.

It is to be understood that the first and second pins 86, 88 extending from the tab 82 engage slots similar in design to first and second slots 310, 312 and have a spring similar to spring 314 disposed about first and second pins 86, 88 in order to facilitate the smooth opening and closing of the door.

Turning to FIGS. 15a, 15b and FIGS. 16a, 16b it can be seen that first and second pins 90, 92 are received respectively in first and second slots 310, 312. Slot 310 is substantially perpendicular to the plane of the disk 42 with slot 312 being substantially perpendicular to the slot 310 and parallel to the plane of the disk 42.

A biasing device or spring 314 is retained in the cartridge 20 and is wound around the first pin 90 so as to hold it away from the first end 316 of first slot 310 as can be seen in FIG. 15b. The spring 114 is then disposed about the third surface 302 of the engagement portion 304 in order to basis the engagement portion 304, and the body 96, so that the second pin 92 is urged towards the first end 318 of the second slot 312.

In this configuration the door locking mechanism 50 can engagingly lock the engagement portion 304 of the door mounting mechanism 48. As can be seen in FIG. 15a, the locking mechanism 50 includes an arm 322 which is pivotally pinned at pivot point 324. The arm is urged into engagement with the engagement portion 304 by a lock spring 326. The locking mechanism 50 includes a recess 328 which exactly mates to the engagement portion 304 in that the recess 328 is substantially a groove which has facing concave and convex "V" shaped surfaces which mate with the "V" shaped surfaces 98, 302 of the engagement portion 304 as seen in FIGS. 15a, 15b.

A disk drive 100 into which the cartridge is received includes a finger mechanism 332 which includes first and second fingers 334, 336. First finger 334 is substantially "Z" shaped and includes a mounting end 338 which is secured to the disk drive 100 and a free end or engaging end 340. The free end or engaging end 340 is substantially parallel to, but translated inboard of, mounting end 338 relative to the drive 100 so that it can be received in a portion of the "L" shaped slot 46 (FIG. 1). The tip 342 of the free end 340 of the first finger 334 includes a curved portion 344 and a beveled portion 346. The beveled portion 346 is meant for engaging a leveled portion 323 of the locking mechanism 50 in order to urge mechanism 50 sidewardly along the horizontal leg of "L" shaped slot 46 in order to disengage the recess 328 from the engagement portion 304 of the mounting mechanism 94 as can be seen in FIGS. 16a, 16b. This disengaging motion thus spaces the locking mechanism 50 from the mounting mechanism 48 as can be seen in FIG. 2. It is to be understood that in FIG. 2, the finger mechanism 332 has been removed so that the positioning of the locking mechanism 50 and the mounting mechanism 48 can be clearly seen.

With the locking mechanism 50 moved outwardly, the curved potion 344 of the tip 42 of the first finger 334 comes into engagement with the "V" shaped first surface 98. The tip 342 urged the first surface 98, the engagement portion 304, and the mounting mechanism 48 rearwardly, causing the mounting mechanism 48 to pivot about the first pin 90. This simultaneously cause the first pin 90 to be urged downwardly toward the first end 316 of the first slot 310 against the force of the spring 314. Simultaneously, the second pin 92 is urged away from the first end 318 of the slot 312 against the force of the spring 314. As the second pin 92 passes over the first pin 90, the door moves into the semi-opened position as shown in FIG. 2. As the finger 334 is urged further into the cartridge 20 with the cartridge 20 being urged further into the drive 100, the finger 334 causes the engagement portion 304 and the second pin 92 to be further urged away from the first end 318 of the second slot 312. As this occurs, the first pin 92 is urged upwardly to about the position of FIG. 16b with the door fully opened as seen in FIG. 16a. In this position, the curved tip 348 of the second finger 336, which second finger 336 is mounted onto the first finger 334 and is substantially parallel to the first finger 334, engages the second surface 300 of the mounting means 48 in order to lockingly retain the mounting means 48 in a rearward position and thus retain the door 44 in the fully opened position as show in FIG. 16A. It is to be understood that the second finger 336, in a preferred embodiment, is comprised of a leaf spring.

When it is desired to remove the cartridge from the drive, the cartridge is ejected from the drive. As the cartridge is being ejected from the drive, the finger mechanism 332 which is affixed to the drive and thus stationary, is automatically removed from the interior the cartridge due to the motion of the cartridge. As this occurs, the door pivots to the closed position as shown in FIG. 1 and the locking mechanism 50 lockingly engages the mounting mechanism 48 in order to lock the door 44 in the closed position as shown in FIG. 1.

Figure 17:
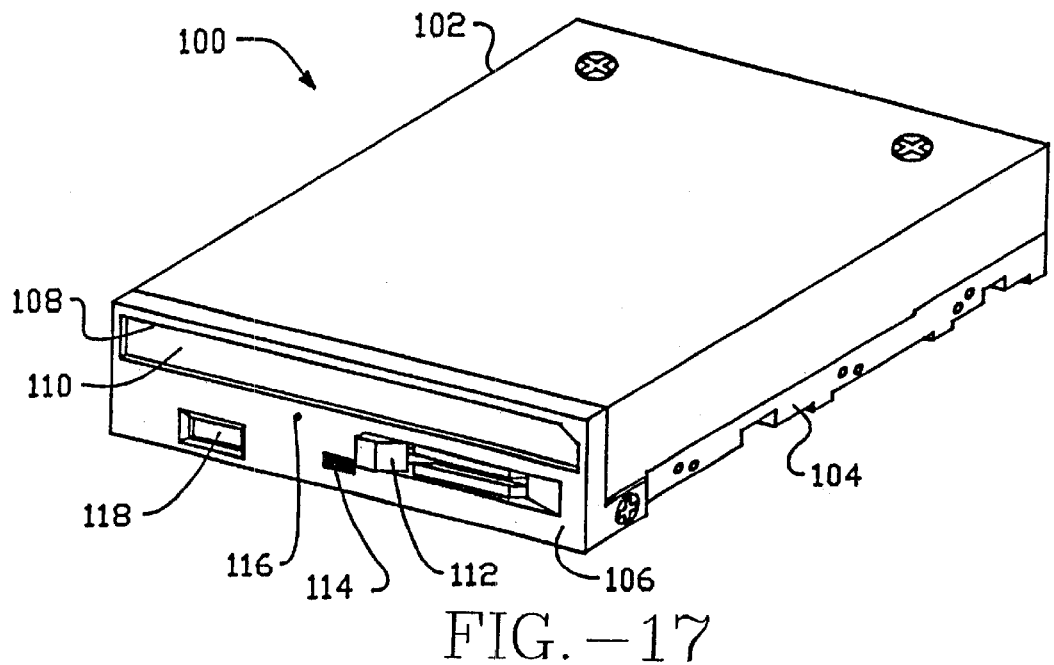
FIG. 17 depicts a prospective view of an embodiment of the disk drive of the invention.
Figure 18:
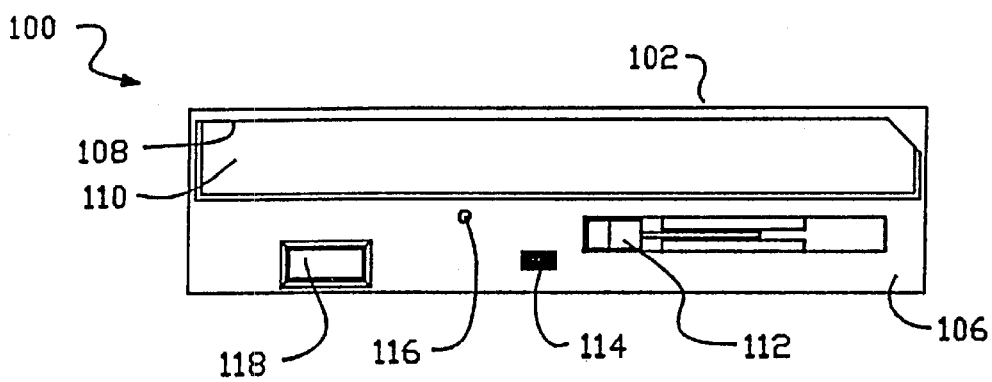
FIG. 18 depicts a front view of the embodiment of the disk drive of FIG. 17.

FIG. 17 depicts a perspective view of an embodiment of the disk drive 100 of the invention. Disk drive 100 includes an outer housing 102 which is mounted on a baseplate 104. The disk drive 100 further includes a front panel or bezel 106 which has a cartridge receiver opening 108 through which the cartridge of FIG. 1 is received and a door 110 which closes the cartridge receiver opening. Through the front panel 106 extends an operating lever 112 which can be positioned through a multiple of positions in order to operate the drive 100. Also on the front plate 106 is an indicator light 114 and an emergency access port 116 and a shut off power button 118.

Figure 19A:
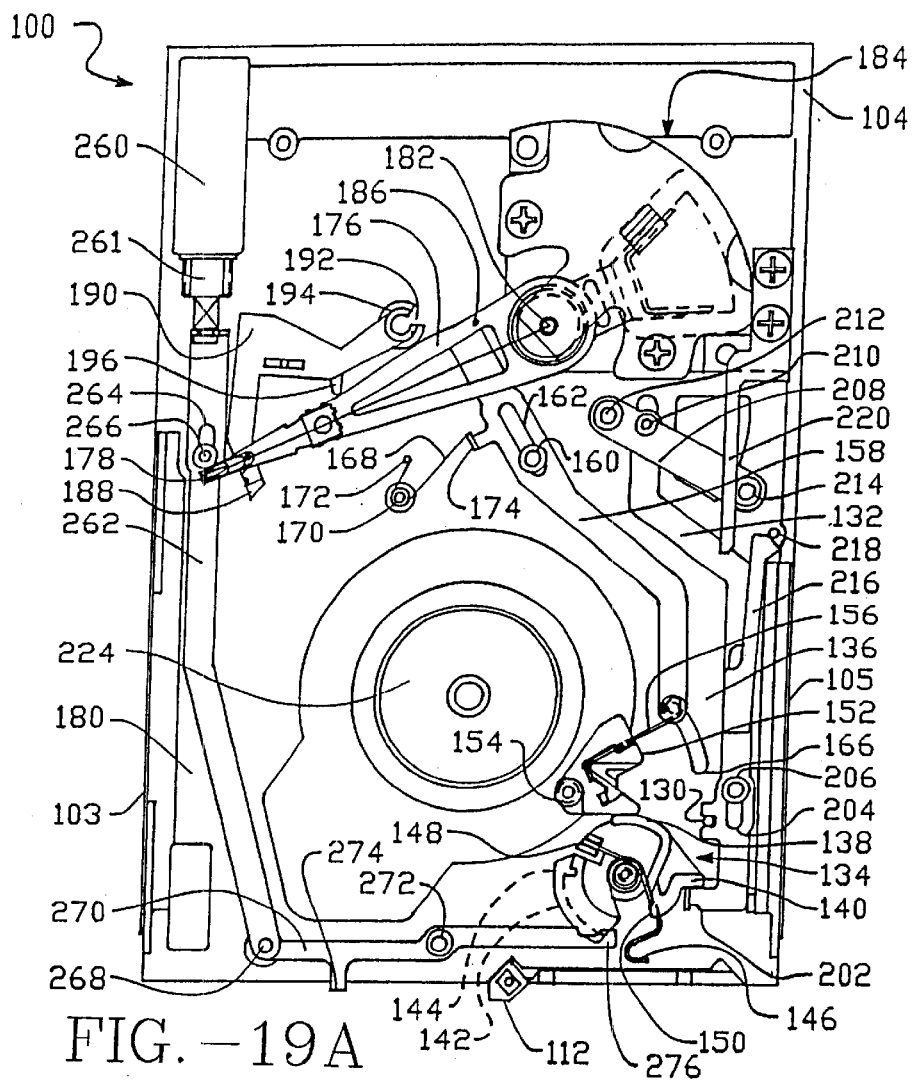
FIGS. 19a and 19b depict top and bottom views, respectively, of the disk drive of FIG. 17 with the housing removed and the arrangement of the disk drive positioned in a cartridge unloaded position.
Figure 19B:
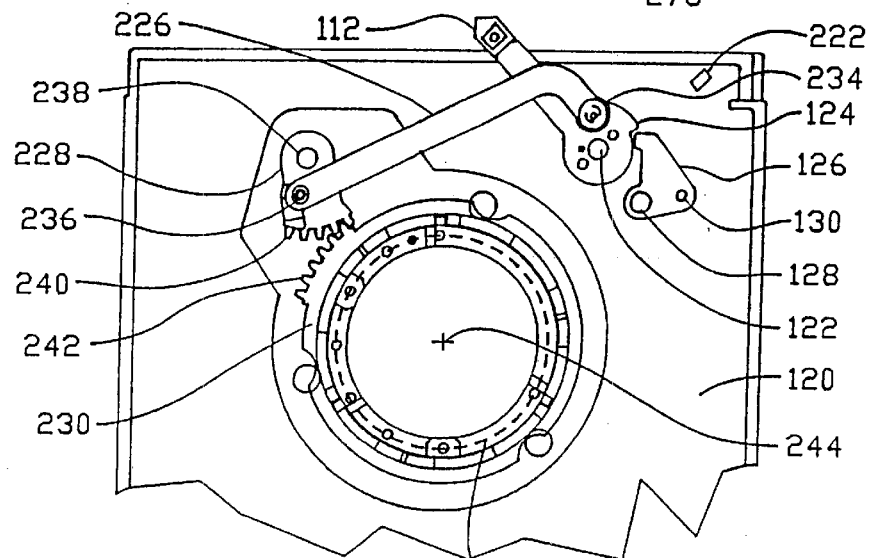

FIGS. 19a and 19b depict the top and bottom views of the disk drive of FIG. 17 with the outer housing 102 removed. FIGS. 19a and 19b show the disk drive 100 in the cartridge unloaded mode as the disk drive 100 would appear prior to the insertion of a cartridge into the disk drive 100. As shown in FIGS. 19a and 19b, the operating lever 112 is in an initial reference position which is designated as a reference position of 0°. The operating lever is pivotally mounted to the bottom side 120 of the baseplate 104 and at pivot point 122 and includes shoulder 124 which be engaged by an actuator lock lever 126 in order to lock the position of the operating lever 112 in the position shown in FIGS. 19a and 19b. The actuating lock lever 126 is pivotable about pivot point 128 and includes a pin 130 which extends through the baseplate 104 to engage a cartridge link 132. As will be explained more fully hereinbelow, as the cartridge links 132 move with the insertion of the cartridge into the disk drive 100, the pin 130 moves resulting in the rotation of the actuator lock lever 126 out of the way of the shoulder 124 such that the operating lever 112 can extend further out from the housing by about 180° from the reference position in FIGS. 19a and 19b to the position in FIGS. 20a and 20b.

Secured to the operating lever 112 and pivotable about pivot point 128 is an actuating or operator lever cam arrangement 134. This actuating or operator lever cam arrangement 134 is positioned relative to the top side 136 of the baseplate 104. This cam arrangement 134 pivots the same amount as does the operating lever 112. The actuating or operating cam lever arrangement 134 which is shown in greater detail in FIGS. 25a and 25b includes a retractor lever camming surface 138, a cartridge link engagement projection 140, a locking cam surface 142 and a locking shoulder 144. Disposed about the pivot point 122 is an actuator or operating lever return spring 146. This return spring 146 is secured in grooves 148 and 150 of the operating lever cam arrangement 134. This return spring 146 is used to engage the cartridge link 132 as can be seen in subsequent figures and as described hereinbelow is used to extend the operating lever 112 out from the disk drive 100 in preparation for the ejection of the cartridge 20 from the housing 100.

An actuator arm retractor lever 152 is pinned for rotation at pin 154. Retractor lever 152 engages and rides on retractor lever camming surface 138, such that retractor lever 152 is urged to pivot about pin 154. Contained in grooves in the actuator arm retractor lever 152, is a retractor spring 156. Retractor spring 156 operably connects the retractor lever 152 to a retractor link 158. Retractor link 158 is positioned to move relative to the top side 136 of the baseplate 104, but is constrained by a pin 160 extending from top side 136 which projects through slot 162 of the retractor link 158. Additionally, a pin 164 which is downwardly dependent from the retractor link 158 extends through a slot 166 in the baseplate 104. The retractor link 158 is biased toward the retractor lever 152 by a spring 168 which is coiled about pin 170 and secured at point 172. Spring 168 engages retractor link 158 at tab 174. As depicted in FIG. 19a, the retractor link 158 holds the actuator arm 176 in a rearward retracted position so that the actuator arm 176 and the read/write transducer 178 mounted thereon is out of the way of and not damaged by the introduction of a cartridge 20 into the receiving compartment 180 of the disk drive 100. It is to be understood that two transducers are preferably mounted on actuator arm 176 in order to transfer data to the upper and lower surface of the disk 42, but for simplicity only the upper transducer is shown in the figures.

The actuator arm 176 is mounted for rotation at pivot point 182 and is pivoted by voice coil motor 184. The retractor link 158 engages the actuator arm 176 by means of a pin 186 which is downwardly dependent from the actuator arm 176. As can be seen in the sequence of the next figures, through the rotation of the operating lever cam arrangement 134, the retractor lever 152 and the retractor link 158 allow the actuator arm 176 to move from the retracted position, shown in FIG. 19a, to the release position, shown in FIG. 24a, so that the read/write transducer can transfer data between the head and the disk contained in the cartridge. As will be more fully discussed hereinbelow, the actuator arm 176 just rearwardly of the read/write transducer 178 rests on a ramp 188 located at the end of ramp arm 190. Ramp arm 190 is mounted for pivotal rotation at pivot point 192 and is biased by a spring 194 to rotate in a counterclockwise direction in order to assist the delivery of the read/write transducer 178 to a disk contained in a cartridge. The actuator arm 176 can engage a tab 196 extending from the ramp arm 190 in order to urge the ramp arm 190 rearwardly as the actuator arm 176 is urged rearwardly to a retracted position by the retractor link 158. In the position shown in FIG. 19a, the actuator arm 176 adjacent to the read/write transducer 178 has moved up a ramp surface 188 and is held behind a detent or bump 200 in back of the ramp surface 188 in the retracted position shown in FIG. 19a. Alternatively, the actuator can be held in a recess or reverse sloping ramp behind ramp 188.

Figure 23A:
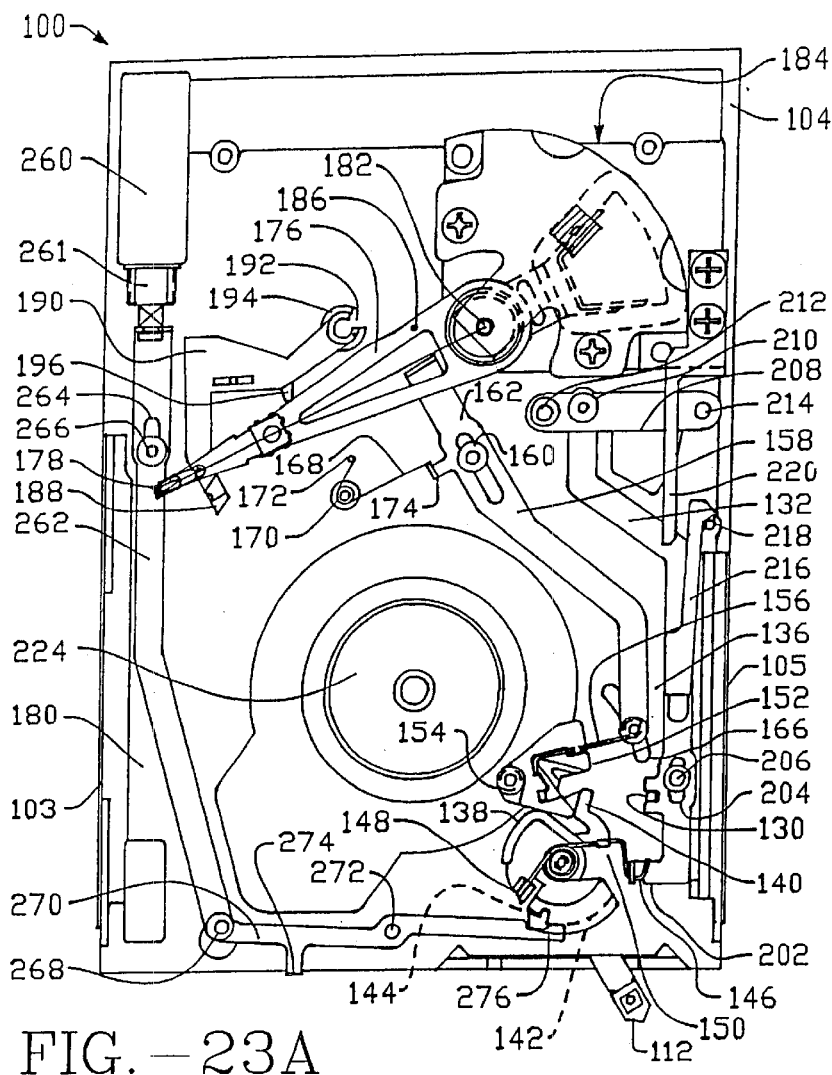
FIGS. 23a and 23b depict top and bottom views of the embodiment of the FIG. 17 with the outer housing removed and with the mechanism of the disk drive continuing in the actuator unlocking sequence with an operating lever return spring engaged for causing the operating lever to being extended from the drive when it is desired that the cartridge be ejected from the drive.

The principal purpose for the detent 200 located on the ramp arm 190 is to prevent the unloading of the transducers from the ramp when the ramp and the actuator arm are in the release position shown in FIG. 23a and preparatory to the voice coil motor actually moving the transducer into an operating relationship with the disk. In all other positions, the ramp and the actuator arm are held back in the retracted position by the retractor arm 158.

As described above, the operating lever cam arrangement 134 includes a cartridge link engagement projection 140 which engages the cartridge link 132 at tab 202. Cartridge link 132 includes a slot 204 through which a pin 206 secures the cartridge link 132 to the baseplate 104 for motion relative thereto. Secured at the upper end of the cartridge link 132 is a cartridge lever 208. Cartridge lever 208 is pivotally mounted on the cartridge link 132 at pivot point 210. In addition, cartridge lever 208 is pivotally mounted to the baseplate 104 at pivot point 212. Upstanding from the distal end of the cartridge lever 208 is a cartridge engaging pin 214. This pin can engage the J-shaped groove 52 in the cartridge shown in FIG. 8.

Secured to the cartridge link 132 is a detent lever 216. The detent lever 216 can be positioned on either side of detent pin 218 in order to secure the position of cartridge engaging pin 214 and cartridge lever 208 from the cartridge release or rejection position of FIG. 19a to the cartridge locking or retention position of FIG. 20a.

As more fully disclosed in the above referenced co-pending patent application, a cartridge door opening finger 220 is secured to the baseplate 104 and serves to open the cartridge door as the cartridge is inserted into the drive 100.

In a preferred embodiment, the spindle motor 124, which serves to bring the disk contained in the cartridge up to full rotational speed can be translated from a position shown in FIG. 19b to the position shown in FIGS. 21b through 24b where the motor has been translated into a motor engagement position with respect to the cartridge of the disk drive. The spindle motor 224 is translated through a motor link 226, a motor gear 228, a motor ring 230 and a motor bearing plate 232.

The motor ring 230 is more fully disclosed in FIGS. 28a and 28b. The motor bearing plate 232 is more fully disclosed in FIGS. 27a and 27b.

The motor link 226, as shown in FIG. 19a, is substantially J-shaped and pivotally pinned to operating lever 112 at pivot point 234 and pivotally pinned to motor gear 228 at pivot point 236. Motor gear 228 is itself pivotally pinned to the baseplate 104 at pivot 238. Movement of the operating arm 112 causes the motor gear 228 to pivot about pivot point 238. Motor gear 228 includes a set of teeth 240 which engage and mesh with a set of teeth 242 extending from the motor ring 230. Accordingly, movement of the operating lever 112 causes the motor ring 230 to rotate about axis 244. As can be seen in FIG. 28b, motor ring 230 includes a Z-shaped slot 246. The motor bearing plate 232 in FIGS. 27a and 27b includes, in a preferred embodiment, three pins 248 which engage three Z-shaped slots, such as slot 246 in FIG. 28b. The spindle motor 224 is secured to the motor bearing plate 232 and the motor bearing plate 232 can translate along with the spindle motor 224 upwardly and downwardly perpendicular to the plane of FIGS. 19a, 19b, in order to cause the spindle motor 224 to load against the baseplate 104 and to engage the fingers of the cartridge positioned in the disk drive 100. This translational motion is afforded by the movement of the pins 248 in the slots 246 between the flat surfaces 250 and 252 as connected by the ramp 254. The motor bearing plate 232 includes bores 256 which allow the motor bearing plate 232 to be pinned to the baseplate 104 so that the motor bearing plate 232 can be translated by the operating lever 112 relative to the baseplate 104 as the bores 256 slide relative to the pins secured to the baseplate 104. As can be seen in FIG. 27b, the pins 248 are positioned at the end of a elongated load beam or springs 258. This allows the motor to be fully loaded against the baseplate 104 and the fingers of the cartridge, accounting for any variations so that the cartridge is properly seated onto the spindle motor 224.

Additionally positioned in the disk drive 100 is a solenoid 260 which is used to lock the position of the operating lever cam arrangement 134 and thus the operating lever 112 in the full operating position as shown in FIGS. 24a, 24b. The solenoid 260 is engaged with an elongated solenoid link 262. A spring 261 urges solenoid link 262 away from the housing of solenoid 260 with the plunger of solenoid 260 pulling the solenoid link 262 toward the housing of solenoid 260 and against spring 261. Solenoid link 262 includes a slot 264 through which a pin 266 is disposed. Pin 266 is secured to the baseplate 104 such that the solenoid link 262 can be translated through the motion of the solenoid 260 past the pin 266. Solenoid link 262 is pivotally secured at pivot point 268 to a solenoid lock arm 270 which is itself pivotally pinned to the baseplate 104 at pivot point 272. Between the points 268 and 272 on the solenoid lock arm 270, is an emergency release tab 274 which can be urged rearwardly through the insertion of a pin through port 116 (FIG. 17).

At the other end of the solenoid lock arm 270 is a lock tab 276 which can engage the locking shoulder 144 of the operating lever cam arrangement 134 as shown in FIG. 24a. In order to disengage the lock tab 276 from the arrangement 134 when there is a power failure to the drive, a pin is inserted through port 116 in order to urge to the solenoid locking arm 270 rearwardly pivoting at about pivot point 272, urging the locking tab 276 out of engagement with the shoulder 144 so that the operating lever 112 can be urged out of the drive by return spring 146 to the position shown in FIG. 23a in order to allow the cartridge to be manually ejected from the disk drive 100 should there be a power failure. Thus, the cartridge can be ejected using lever 112 without damage to the disk, the data on the disks or the heads.

Figure 20A:
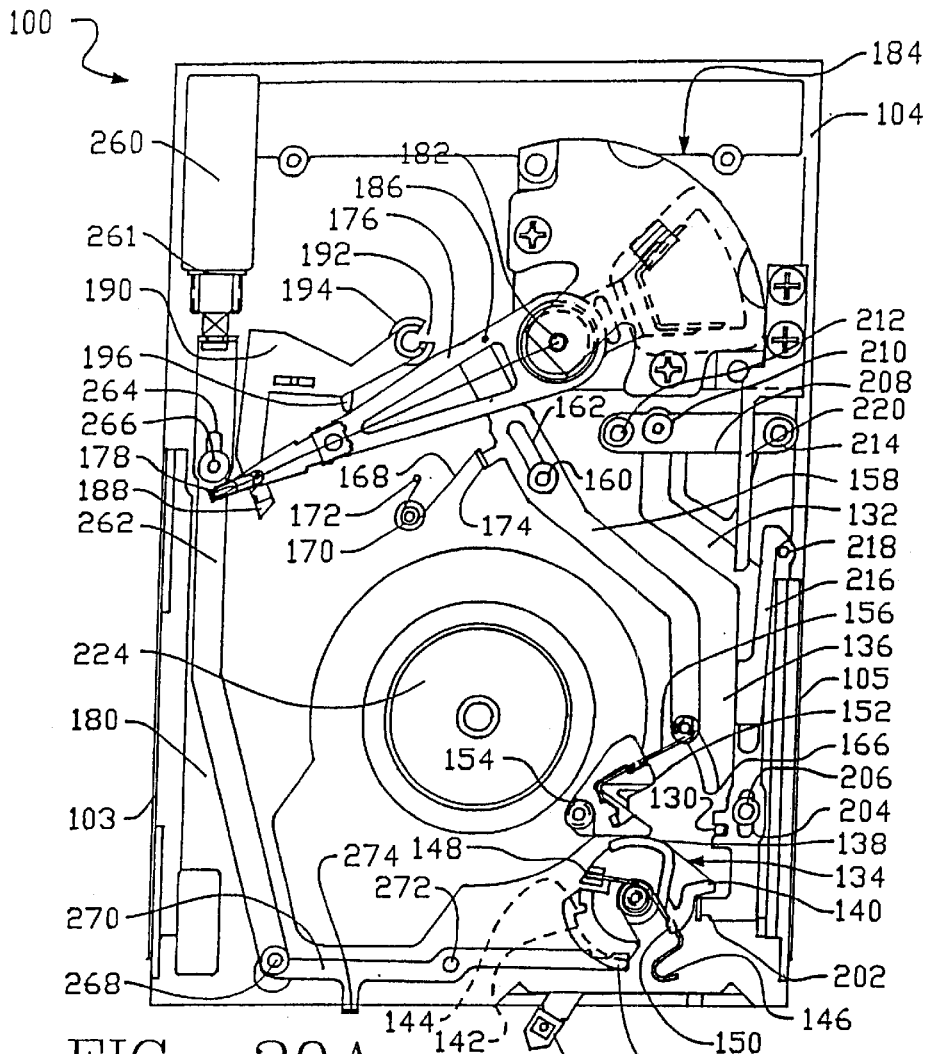
FIGS. 20a and 20b depict top and bottom views of the disk drive of FIG. 17 with the outer housing removed and with the disk drive mechanism configured in a cartridge loaded position.
Figure 20B:
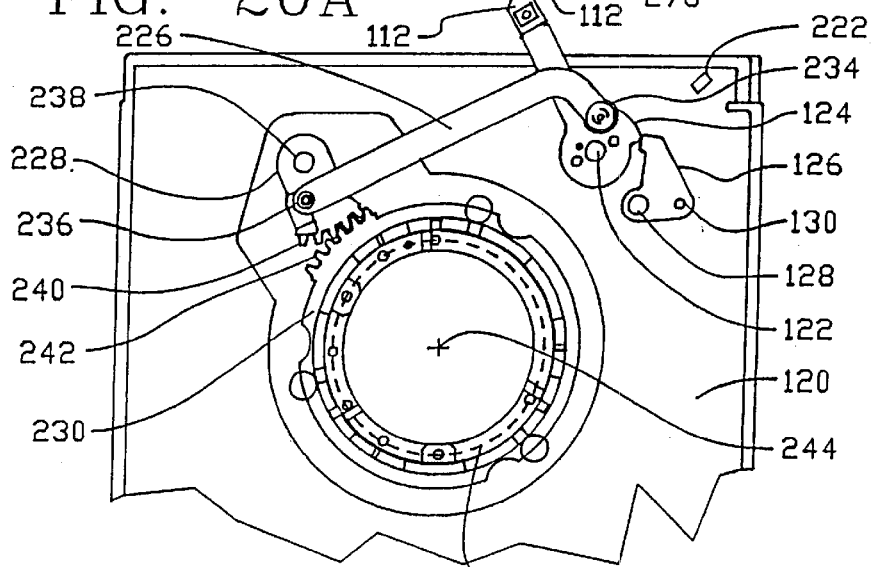

FIGS. 20a and 20b show the mechanisms of the drive 100 in the cartridge loaded position. In these figures, the cartridge is not included in order to highlight the mechanisms of the disk drive 100. As can be seen in FIGS. 20a and 20b, the operating lever 112 has been urged out of the recess in the front 106 of drive 100 to a position which is about 18° from the positions of FIGS. 19a, 19b. This is the result of the J-shaped groove 52 (FIG. 8) of the cartridge 20 engaging the upstanding pin 214 of the cartridge lever 208 and urging pin 214 rearwardly to the position shown in FIG. 20a. As this occurs, the cartridge link 132 is urged rearwardly resulting in the pin 130 causing the actuator lock lever 126 (FIG. 19b) to pivot so that the lever 126 comes out of engagement with the shoulder 124 of the operating lever 112 allowing the operating lever 112 to rotate. The rotation of the operating lever 112 to the position shown in FIGS. 20a, 20b is caused by the tab 202 of the cartridge link 132 engaging the cartridge link engagement projection 140 of the operating lever cam arrangement 134.

As can be seen in FIG. 20a, with the insertion of the cartridge, the detent lever 216 being somewhat flexible, has been repositioned to the other side of detent pin 218 in order to assist in holding and locking the cartridge in the drive.

Turning to FIGS. 21a, 21b, the operating lever is then manually urged to the position shown in FIGS. 21a and 21b by the user. The position of the operating lever 112 is approximately 45° from the position shown in FIGS. 19a, 19b. In this position, the motor has been translated upwardly against and to engagement with the baseplate 104 and the cartridge in order to properly seat the spindle motor with respect to the disk. At this point, the pins 248 projecting from the motor bearing plate 232 have traversed the ramp 254 and rests in the appropriate flat surfaces 250 of the Z-shaped groove 246.

Next, the operating lever 112 is moved to the position shown in FIGS. 22a, 22b which is approximately 65° from the position shown in FIGS. 19a, 19b. In this position, the actuator arm 176 is in the process of being released from the refractive position. As can be seen in FIG. 22a, the ramp arm 190 has pivoted in a counterclockwise manner approximately 8° in order to position the actuator arm and the read/write transducer more closely to the disk preparatory to unloading the transducer onto the disk.

Figure 23B:
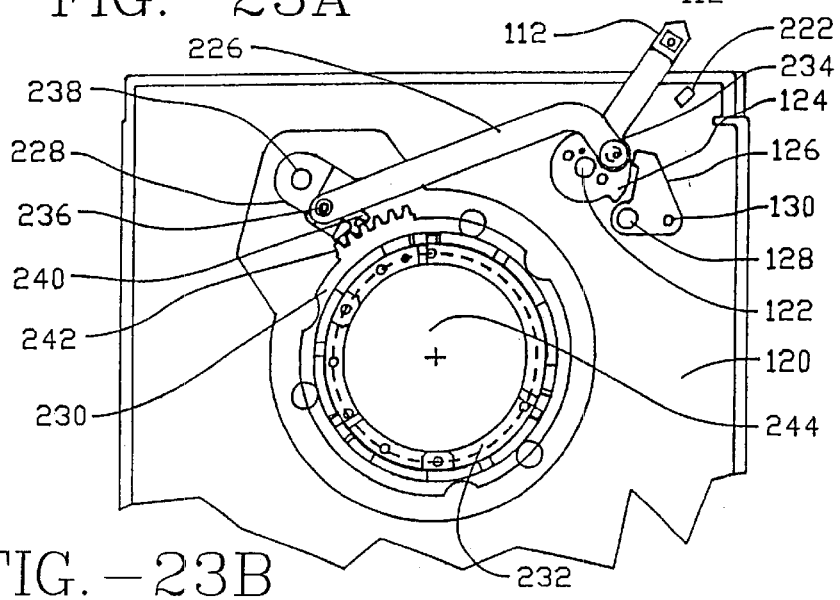
Figure 26:
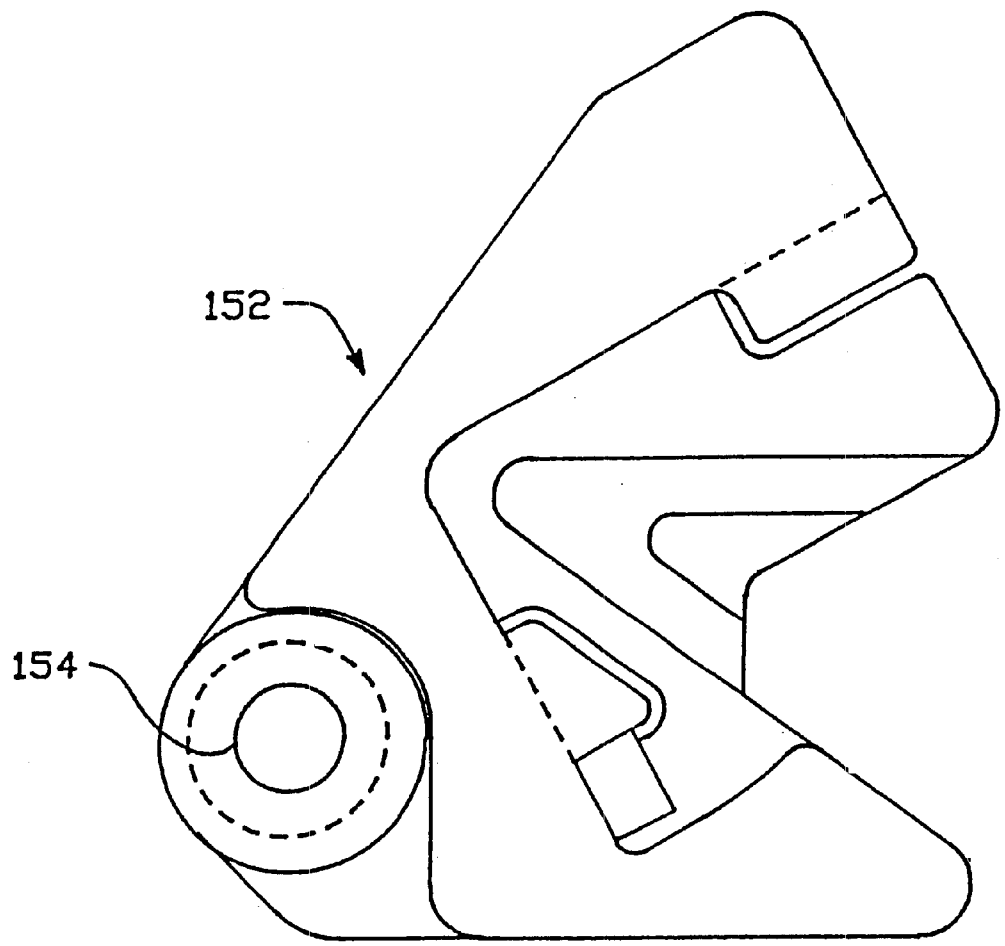
FIG. 26 depicts a plan view of the retractor lever of the disk drive of the invention of FIG. 17.

Turning to FIGS. 23a and 23b, the operating lever 112 is then moved to the position shown which is about 750 from the position of FIGS. 19a, 19b. In this position, the cartridge link 132 is moved almost to its forward most position so that the actuator arm is released. Further, the return spring 146 begins to engage the tab 202 of the cartridge link 132 in order to begin to bias the operating lever cam arrangement 134. From this position, the lever is urged by the user to the position of FIGS. 24a, 24b which is about 90° from the position of FIGS. 19a, 19b. In this position, the cartridge and drive 100 are fully locked in the operating position with the actuator arm able to fully access the disk in the cartridge. Further lever 112 contacts switch 222 in order to power up the spindle motor and drive logic so that read/write functions can begin. It is noted that during the motion of the operating lever 112 from the positions of FIGS. 21a, 21b to the position of FIGS. 24a, 24b, that while the motor ring and the motor bearing plate move relative to each other caused by the motion of the operating lever, that the motor is not further loaded toward the baseplate as the pin of the motor bearing plate rides in the flat surface 250 shown in the motor ring 230. In the position of FIGS. 24a, 24b, the lock tab 276 of the solenoid lock arm 270 has been dropped into locking engagement with the shoulder 144 of the arrangement 134 locking the arrangement in position with the return spring 146 fully loaded against the tab 202 of the cartridge link 132. The solenoid lock arm 270 is urged into this position due to the pressure placed on the solenoid link 262 by the solenoid spring 261.

After the appropriate read/write operations have been completed with respect to the cartridge, the process of ejection the cartridge from the drive 100 begins with the solenoid 260 unlocking the solenoid lock arm 270 from the operating lever cam arrangement 134, with the return spring 146 urging the operating lever 112 out of the drive 100 to the position shown in FIGS. 23a, 23b. This occurs when the operator pushes button 118 causing the solenoid to retract the solenoid link against the solenoid spring. From this position the user moves the operating lever 112 sequentially from the position shown in FIGS. 23a, 23b to the position in FIGS. 19a, 19b in order to first urge the actuator arm to a rearward retracted position with the actuator arm pushing against the tab 196 and the transducers resting on the ramp 188, with the motor unloaded, and finally with the cartridge ejected by the motion of the pin 214 from the position shown in FIG. 20a to the position shown in FIG. 19a.

Figures 29A, 29B:
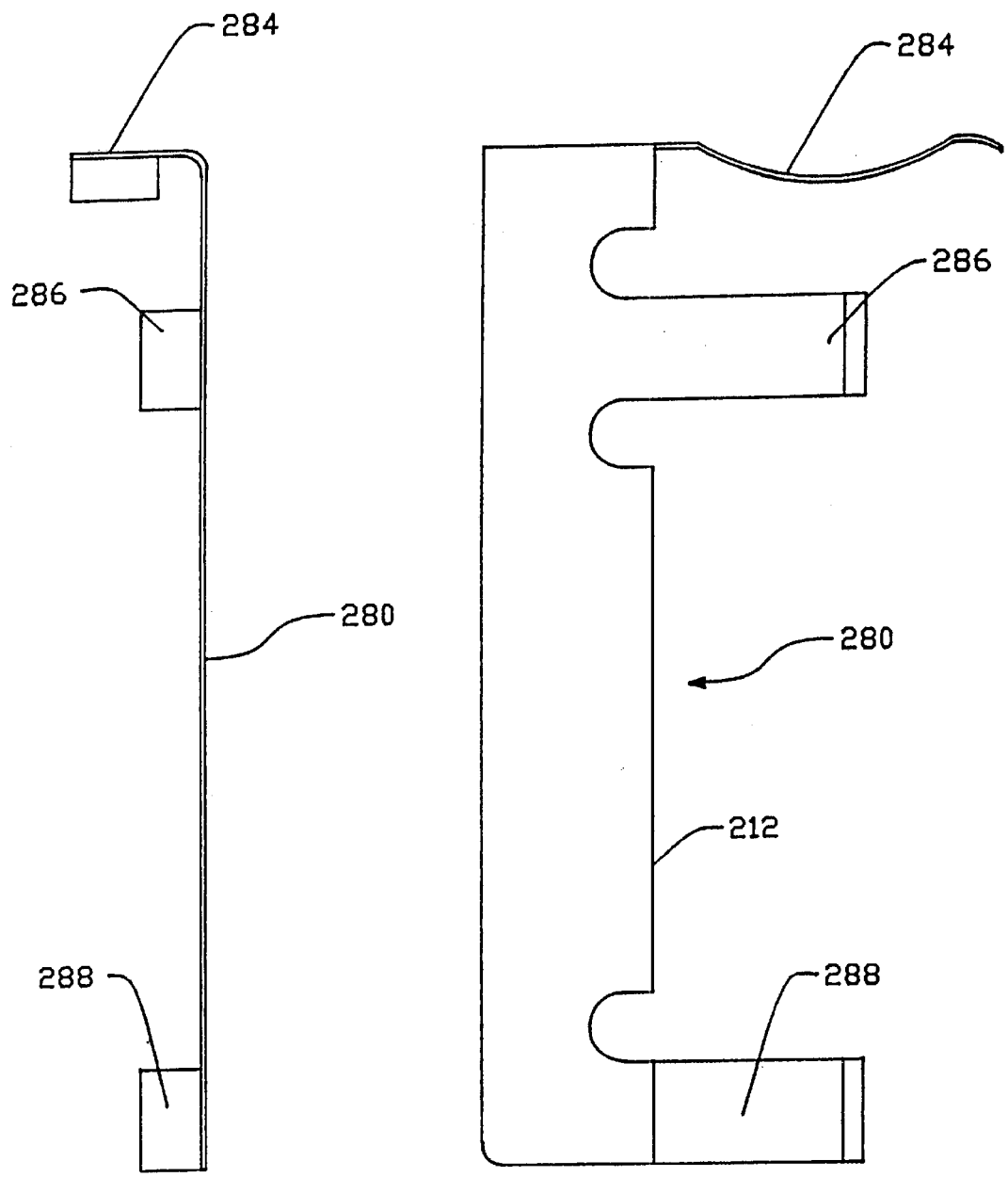
FIGS. 29a and 29b depict a cartridge biasing spring which fits into the cartridge receiver of the disk drive of FIG. 17 in order to assist in registering the position of the cartridge relative to the disk drive.
Figure 30A:
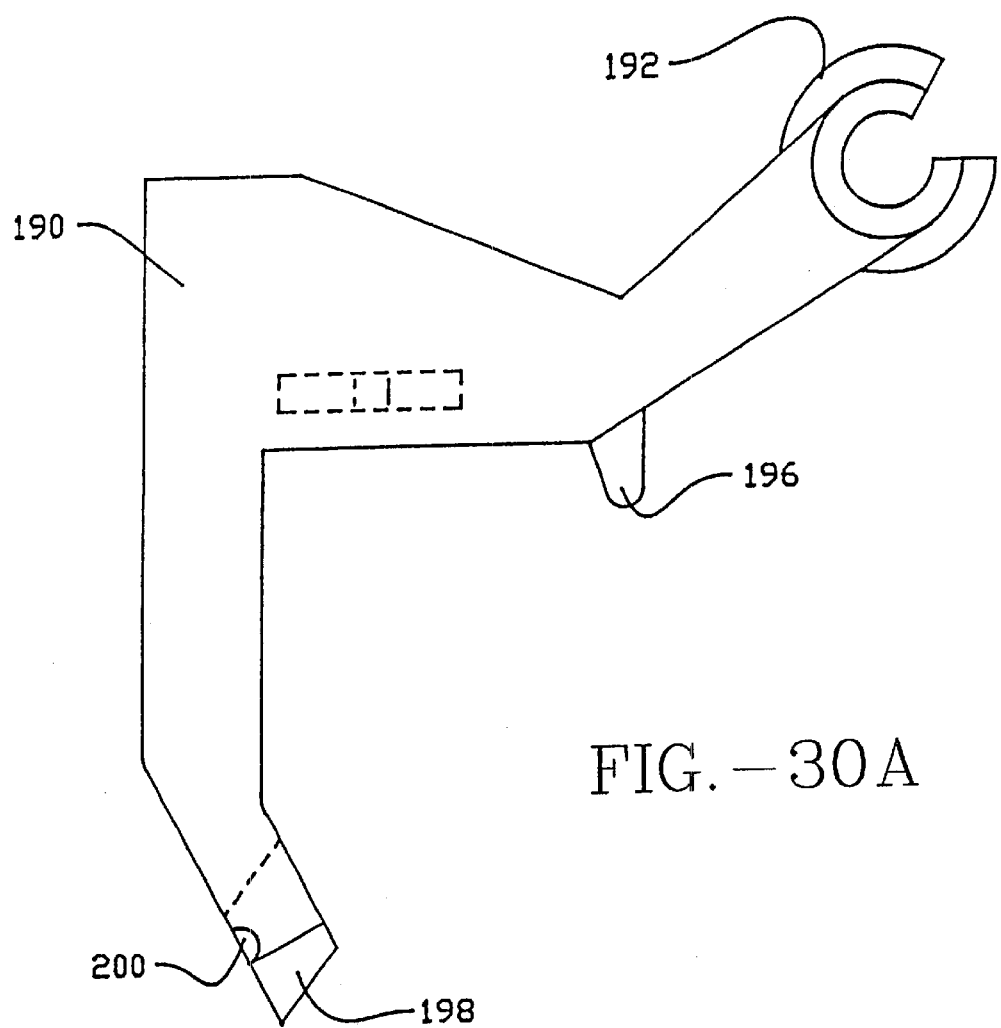
FIGS. 30a, 30b and 30c depict plan, side and partial prospective views of the head loading ramp of the disk drive of the invention of FIG. 17.
Figure 30B:
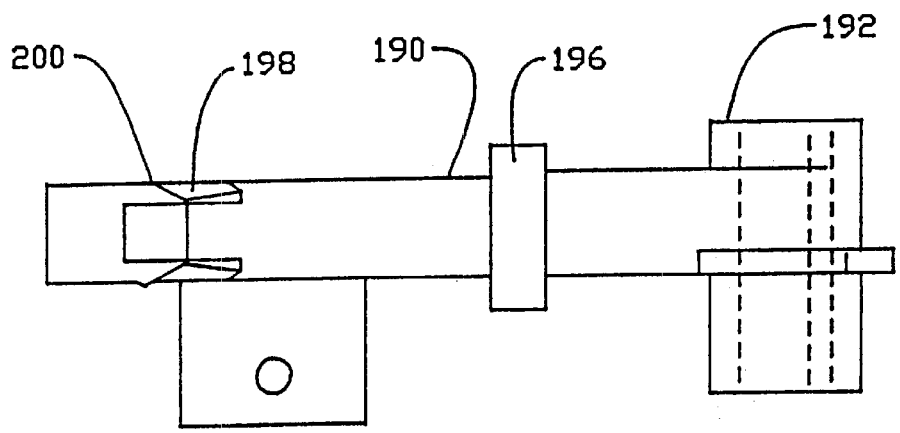
Figure 30C:
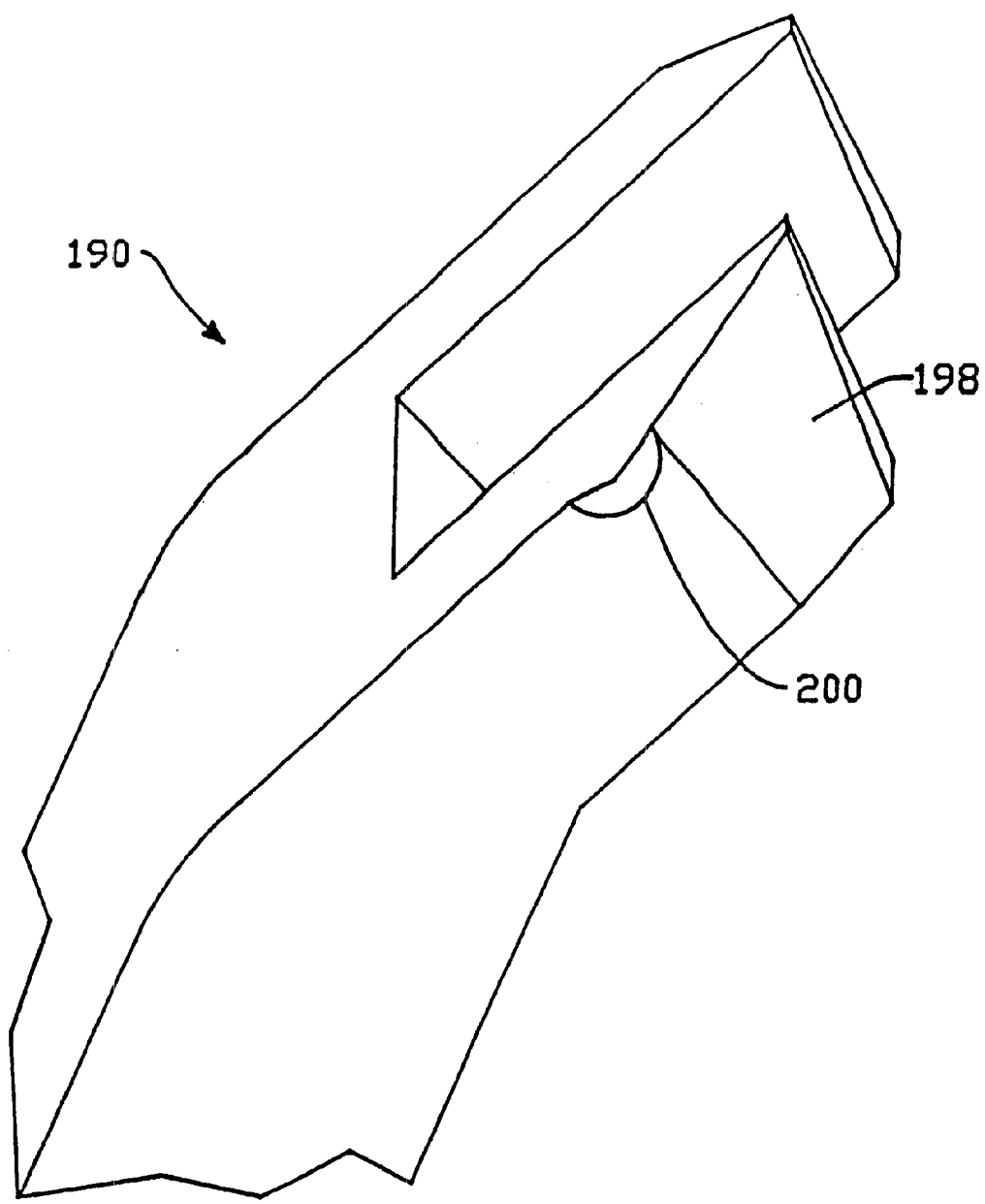

In a preferred embodiment, in order to hold the cartridge in position in the disk drive, the disk drive includes a cartridge bias spring 280 which is shown in FIGS. 29*a* and 29*b*. This bias spring 280 is placed with the elongate portion of the spring 282 disposed in the drive substantially parallel to the front 106 but set back from the front door 110. The spring 280 includes leaf springs 284, 286, 288. Leaf springs 286 and 288 contact the upper surface of the cartridge as the cartridge is inserted into the drive in order to press it downwardly toward the spindle motor. Leaf spring 284 which is disposed adjacent the left side 103 of the housing, urges the cartridge toward the right side 105 of the housing further assisting in the engagement of the upstanding pin 214 with the J-groove of the cartridge.

The operation of a disk drive is as follows. In order to start the disk drive, the cartridge is inserted into the disk drive in order to release the operating lever 112. As the operating lever 112 is urged by the user through the position shown from FIGS. 20*a* to 24*a*, the spindle motor engages the disk in the cartridge. With operating lever 112 engaging switch the spindle motor causes the disk to come up to operating rotational speed, and the actuator arm is released by the mechanism so that the voice coil motor can unload the actuator arm from the ramp onto the disk. In order to stop the process, the logic off button 118 is pushed. Then read/write functions cease and the voice coil motor returns the transducer to the retracted position loaded onto the ramp arm 190. The spindle motor spins down and then the lever 112 projects out of the drive to the position shown in FIG. 23*a*. The operating lever 112 can then be used to cause the retractor link to urge the actuator arm 176 and thus the ramp arm 190 into the rearward retracted position. After this has occurred, the spindle motor is unloaded from the baseplate and the cartridge is rejected as the lever is moved to the position of FIGS. 19*a*, 19*b*. It is noted that should there be a power failure, that the through the use of the port 116, that the operating lever cam arrangement 134 can be unlocked and that the various above linkage, such as the actuator arm retractor linkage, can move the read/write transducer out of the way of the disk without the influence of a voice coil motor so that the cartridge can be removed from the disk drive without damage to the transducers, the disk or the data stored on the disk.

Industrial Applicability

The operation of the disk drive 100 is in accordance with that which has been described hereinabove. From this description it is noted that the disk drive 100 provides for a compact and streamlined drive which can operate to successfully accept and operably engage a disk in a cartridge in order to transfer data between a transducer and the disk. Further, whether there is power to the disk drive or not, the disk drive can successfully cause the transducers to be removed from operable engagement with the disk so that there is no damage to the transducer or the disk and then have the cartridge ejected from the disk drive so that the cartridge can be transported to a desired location or secured in a safe manner should the data on the disk be confidential.

From the above, it further can be seen that this operation is efficiently handled through the use of a single operating lever 112 which coordinates all of the functions as described above.

The removable cartridge 20 of the present invention provides for a design with a compact 3½ inch disk form factor. The door 44 of this design, when engaged by the drive is moved to the interior of the cartridge and positioned in a plane which is substantially parallel to the plane of the disk. Further, with the door so designed, the port through the cartridge which receives the heads and the actuator arm can be placed substantially across the port side of the cartridge with the exception of a space which locates the above door mounting mechanism 48 and the locking mechanism 50 with the "J" shaped groove 52 immediately below. Thus, the present design maximizes the opening by which the heads can access the disk and provides a locking mechanism to ensure that the door will not be opened without the cartridge being inserted in the drive. This design further ensure that door once opened, will be retained in the opened position.

Additionally, as indicated above, the cartridge has been designed in order to ensure that it can be properly handled and inserted into the drive in only the proper orientation so that no damage can result to the heads, actuator arms, or the cartridge itself.

Other aspects and objects of the invention can be obtained from a review of the appended figures and claims.

It is to be understood that other embodiments of the present invention can be fabricated and be within the spirit and scope of the appended claims.

I claim:

1. A removable disk cartridge adapted for insertion into a disk drive having a rotary actuator with an actuator arm which rotates about a pivot point, the actuator arm serving to support at least one read/write transducer for movement in an arcuate path, the disk drive also having a cartridge receiving space including a door opening finger substantially aligned with the direction of cartridge insertion into the disk drive, said removable disk cartridge comprising:
   a data storage disk with at least one disk surface having recording tracks disposed thereon;
   a cartridge housing enclosing said data storage disk, said cartridge housing having a plurality of sides respectively connected at corners which define a cartridge housing perimeter, said plurality of sides including a front side having a transducer access port formed therein to provide access to said data storage disk;
   a hub structure which mounts said data storage disk in said cartridge housing such that said data storage disk rotates around an axis of rotation;
   a slot located in said front side of said cartridge housing, spaced apart from said transducer access port, said slot adapted to receive the door opening finger during cartridge insertion;
   a door opening mechanism within said cartridge housing and adjacent to said slot; and
   a door mounted across said transducer access port and operably connected to said door opening mechanism for movement between (i) a closed position in which said door blocks access to said data storage disk through said transducer access port, and (ii) an open position, said door opening mechanism engaging the door opening finger when said removable disk cartridge is inserted into the disk drive and pivoting said door from said closed position to said open position.

2. The removable disk cartridge of claim 1, wherein said door opening mechanism comprises an engagement element positioned relative to said slot such that said engagement element engages the finger.

3. The removable disk cartridge of claim 1, wherein said door is substantially rigid.

4. The removable disk cartridge of claim 1, wherein said door is biased to said closed position.

5. The removable disk cartridge of claim 4, further comprising a spring adapted to bias said door to said closed position.

6. The removable disk cartridge of claim 1, wherein said door pivots around an axis substantially perpendicular to the direction of insertion of the cartridge into the disk drive.

7. The removable disk cartridge of claim 1, wherein said door is contained substantially within said cartridge housing perimeter in both said closed position and said open position.

8. A method for opening a removable disk cartridge during insertion into a disk drive having a rotary actuator with an actuator arm which rotates about a pivot point, the actuator arm serving to support at least one read/write transducer for movement in an arcuate path, the disk drive also having a cartridge receiving space including a door opening finger substantially aligned with the direction of cartridge insertion into the disk drive, comprising the steps of:

providing a removable disk cartridge comprising
      a data storage disk with at least one disk surface having recording tracks disposed thereon;
      a cartridge housing enclosing said data storage disk, said cartridge housing having a plurality of sides respectively connected at corners which define a cartridge housing perimeter, said plurality of sides including a front side having a transducer access port formed therein to provide access to said data storage disk;
      a hub structure which mounts said data storage disk in said cartridge housing such that said data storage disk rotates around an axis of rotation;
      a slot located in said front side of said cartridge housing, spaced apart from said transducer access port;
      a door opening mechanism within said cartridge housing and adjacent to said slot; and
      a door mounted across said transducer access port and operably connected to said door opening mechanism, said door biased to a closed position;
   pressing said cartridge into the cartridge receiving space;
   receiving the door opening finger into said cartridge housing through said slot;
   engaging the door opening finger with said door opening mechanism; and
   pivoting said door from said closed position to an open position with said door opening mechanism.

9. The method of claim 8, wherein said door opening mechanism comprises an engagement element positioned relative to said slot such that said engagement element engages the finger.

10. The method of claim 8, wherein said door pivots around an axis substantially perpendicular to the direction in which said removable disk cartridge is pressed into the cartridge receiving space.

11. The method of claim 8, wherein said door is contained substantially within said cartridge housing perimeter in both said closed position and said open position.

* * * * *